United States Patent
Back et al.

(10) Patent No.: US 11,212,730 B2
(45) Date of Patent: Dec. 28, 2021

(54) V2X COMMUNICATION DEVICE AND GEO-NETWORKING TRANSMISSION METHOD

(71) Applicant: LG ELECTRONICS INC., Seoul (KR)

(72) Inventors: Seoyoung Back, Seoul (KR); Woosuk Ko, Seoul (KR); Jongseob Baek, Seoul (KR); Jaeho Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 20 days.

(21) Appl. No.: 16/637,655

(22) PCT Filed: Aug. 9, 2017

(86) PCT No.: PCT/KR2017/008613
§ 371 (c)(1),
(2) Date: Feb. 7, 2020

(87) PCT Pub. No.: WO2019/031625
PCT Pub. Date: Feb. 14, 2019

(65) Prior Publication Data
US 2021/0153099 A1 May 20, 2021

(51) Int. Cl.
*H04W 4/02* (2018.01)
*H04W 40/20* (2009.01)
(Continued)

(52) U.S. Cl.
CPC ......... *H04W 40/20* (2013.01); *H04L 41/0803* (2013.01); *H04L 45/745* (2013.01); *H04W 4/023* (2013.01); *H04W 4/40* (2018.02)

(58) Field of Classification Search
CPC ......... H04W 4/40; H04W 4/46; H04W 4/023; H04W 40/02; H04W 40/026;
(Continued)

(56) References Cited

U.S. PATENT DOCUMENTS

2015/0163720 A1 6/2015 Cordeiro De Oliveria Barros et al.
2016/0080235 A1 3/2016 Tan et al.
(Continued)

FOREIGN PATENT DOCUMENTS

JP 2014-072703 A 4/2014

OTHER PUBLICATIONS

ETSI, "Intelligent Transport Systems (ITS); Vehicular Communications; GeoNetworking; Part 4: Geographical addressing and forwarding for point-to-point and point-to-multipoint communications; Sub-part 1: Media-Independent Functionality", Jul. 2014, ETSI EN 302 636-4-1, V1.2.1, pp. 1-104 (Year: 2014).*

(Continued)

*Primary Examiner* — Lan-Huong Truong
(74) *Attorney, Agent, or Firm* — Dentons US LLP

(57) ABSTRACT

A geo-networking transmission method of a V2X communication apparatus is disclosed. The geo-networking transmission method according to an embodiment of the present disclosure includes configuring location information, wherein the location information includes information on a V2X communication apparatus executing a geo-networking protocol, selecting a forwarder candidate among neighboring V2X communication apparatuses included in the location table, determining a forwarder based on a distance between the forwarder candidate and a destination, and setting an address of the determined forwarder as a link layer address of a next hop, and transmitting a geo-networking packet based on the link layer address.

12 Claims, 20 Drawing Sheets

(51) Int. Cl.
*H04W 4/40* (2018.01)
*H04L 12/24* (2006.01)
*H04L 12/741* (2013.01)

(58) Field of Classification Search
CPC ............... H04W 40/20; H04L 41/0803; H04L 41/0813; H04L 41/0816
See application file for complete search history.

(56) References Cited

U.S. PATENT DOCUMENTS

| | | | |
|---|---|---|---|
| 2018/0124186 A1* | 5/2018 | Zanier | H04L 67/147 |
| 2018/0234895 A1* | 8/2018 | Shin | H04W 72/1215 |
| 2019/0141602 A1* | 5/2019 | Tang | H04L 67/12 |

OTHER PUBLICATIONS

NEC Europe Ltd., "Intelligent Transport Systems (ITS); Vehicular communications; GeoNetworking; Part 4: Geographical addressing and forwarding for point-to-point and point-to-multipoint communications; Sub-part 1: Media-Independent Functionality", ETSI TS 102 636-4-1, V1.1.1, DTS/ITS-0030001, ITS WG3, Jun. 2011, pp. 1-75 see pp. 15-16, 54.

Halvard Tubbene, "Performance Evaluation of V2V and V2I Messages in C-ITS", Master of Telematics—Communication Networks and Networked Services, NTNU, Jun. 2015, pp. 1-69, See pp. 19, 23.

* cited by examiner

[FIG. 1]
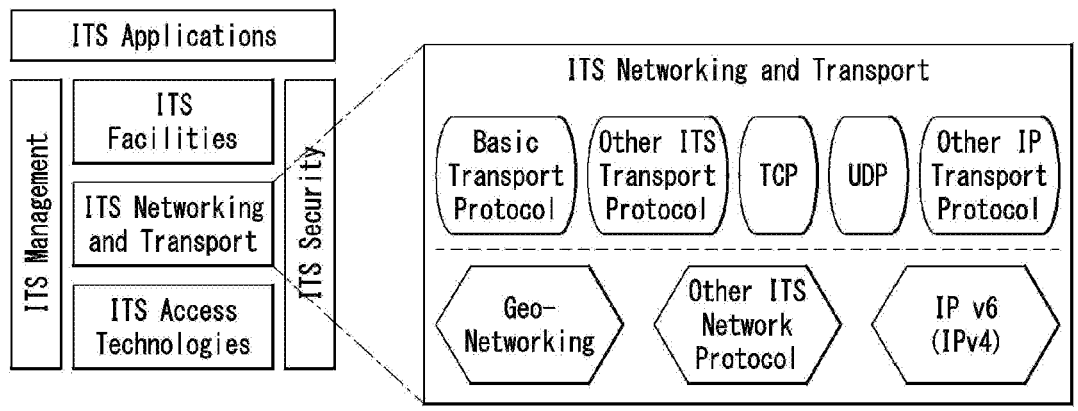
[FIG. 2]
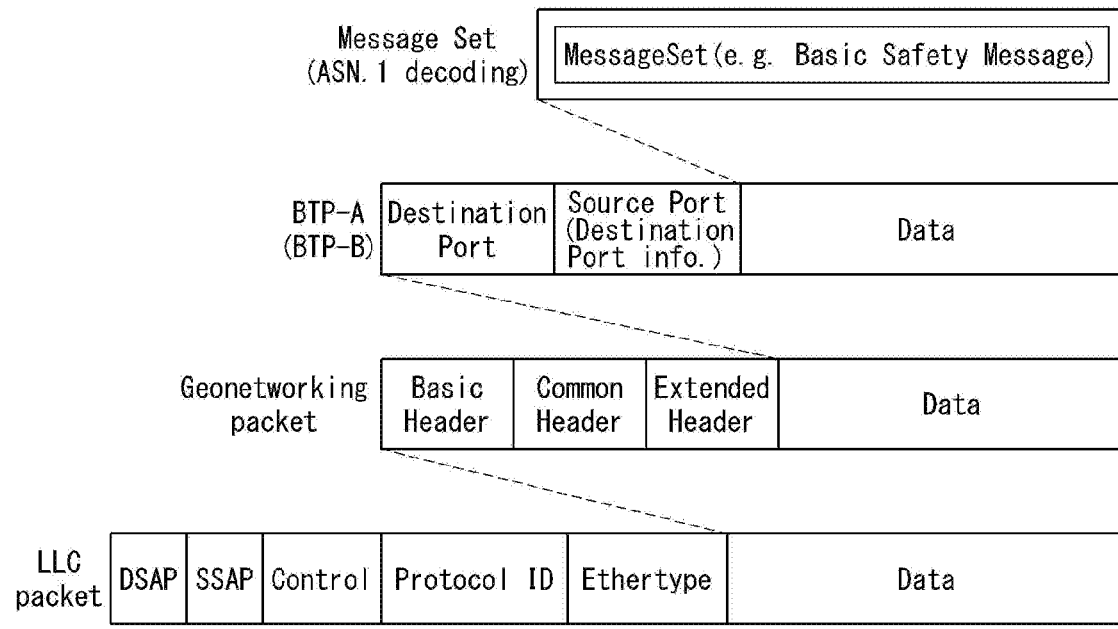

[FIG. 3]

| 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| Version | | | | NH | | | | Reserved | | | | | | | | LT | | | | | | | | RHL | | | | | | | |

(a)

| 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| NH | | | | Reserved | | | | HT | | | | HST | | | | TC | | | | | | | | Flags | | | | | | | |
| PL | | | | | | | | | | | | | | | | MHL | | | | | | | | Reserved | | | | | | | |

(b)

[FIG. 4]
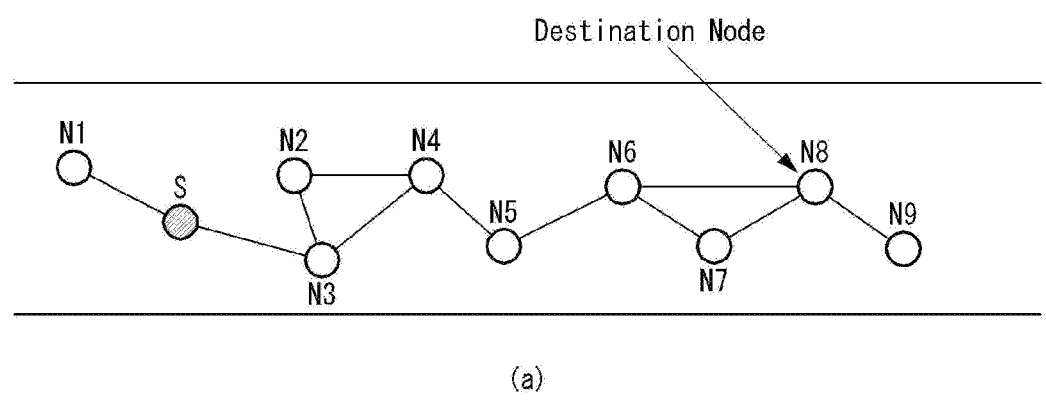
(a)
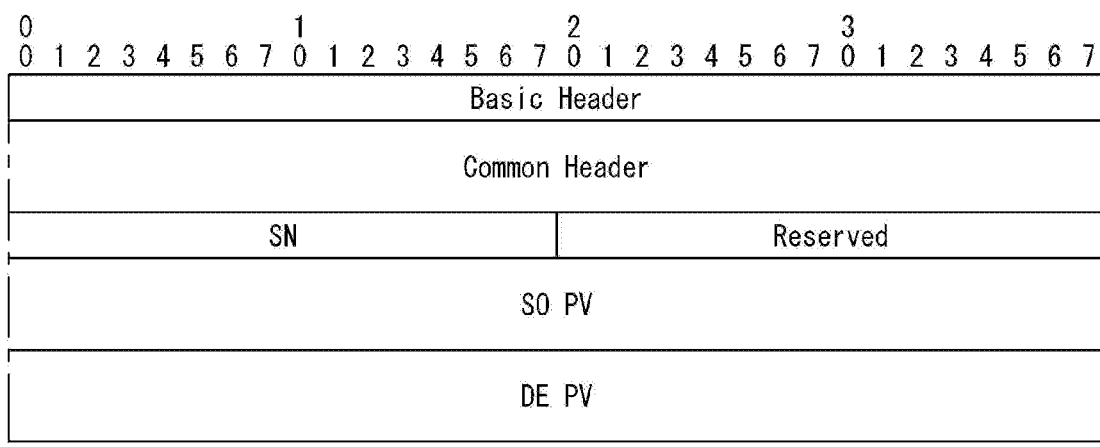
(b)

[FIG. 5]
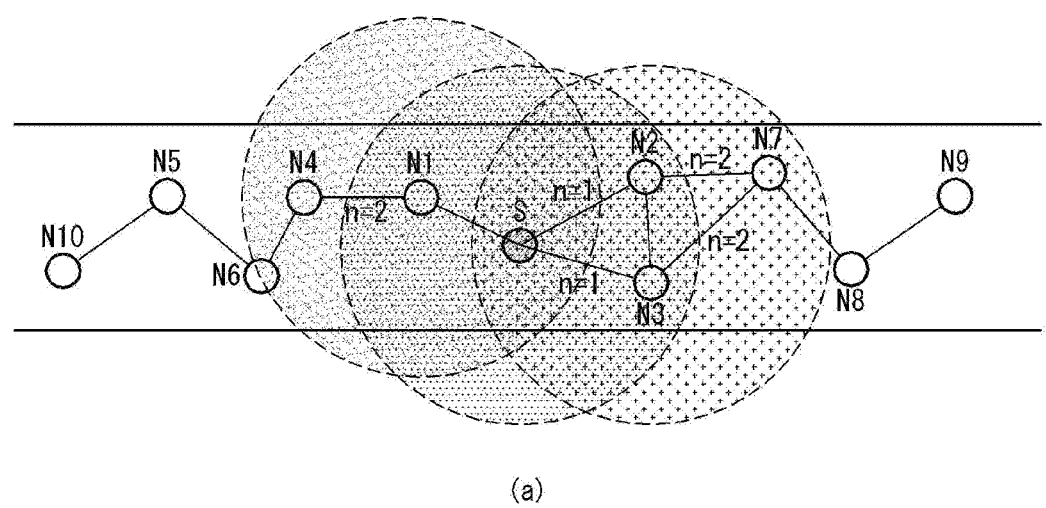
(a)
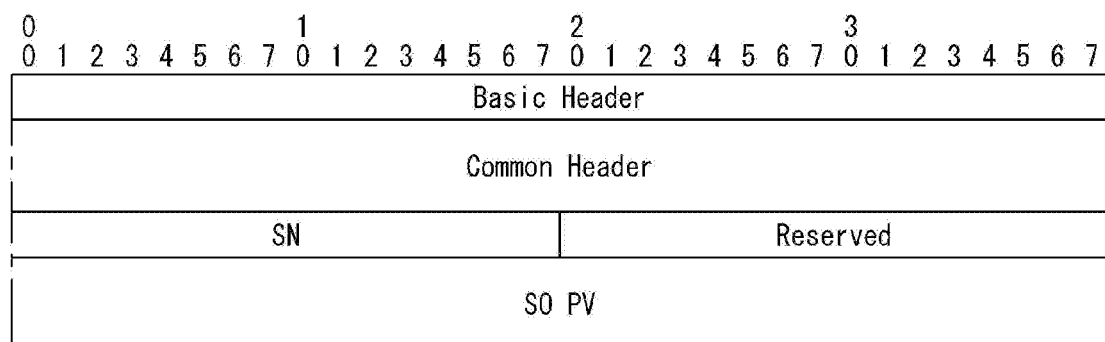
(b)

[FIG. 6]
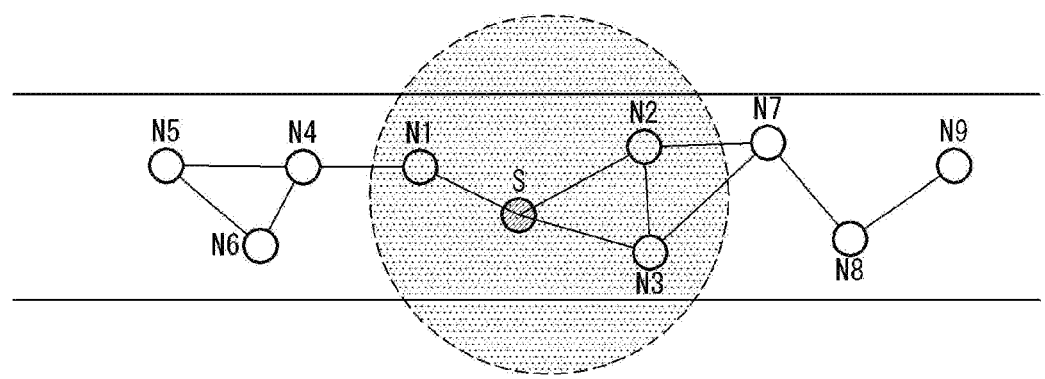
(a)
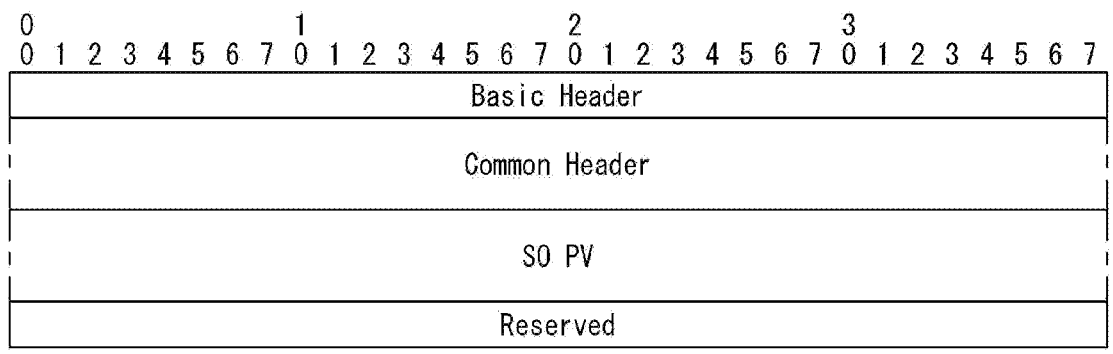
(b)

[FIG. 7]
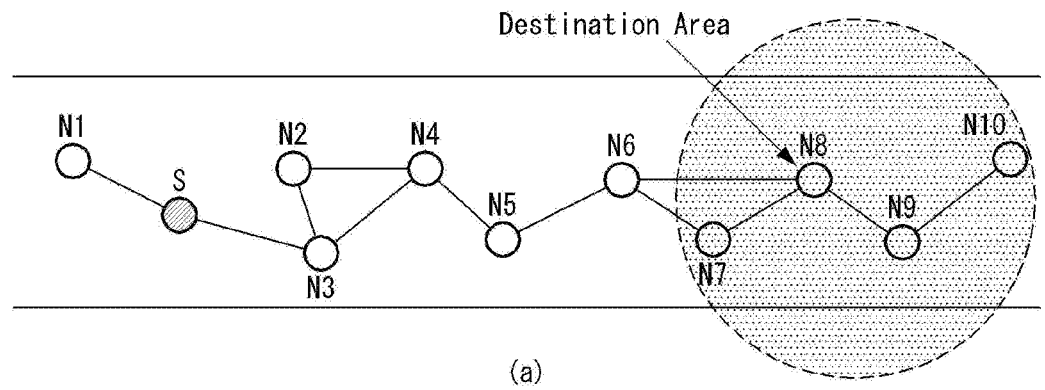
(a)
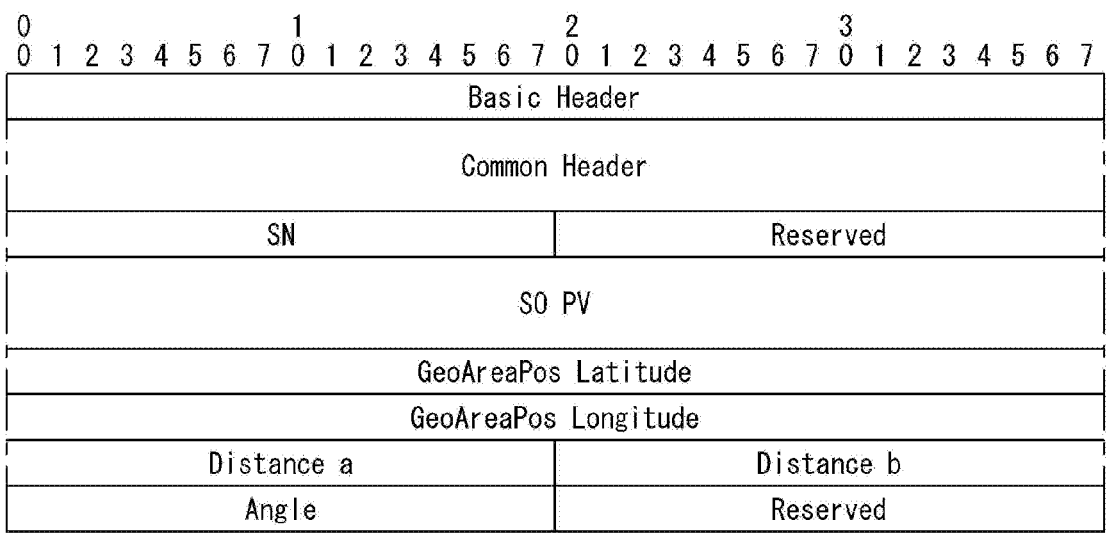
(b)
[FIG. 8]
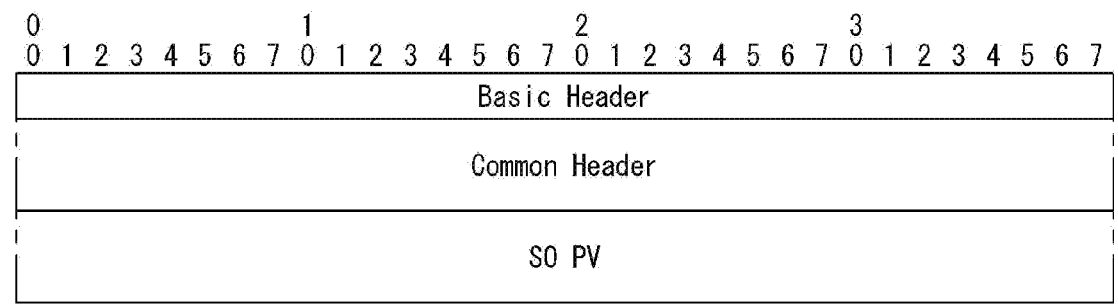

[FIG. 9]
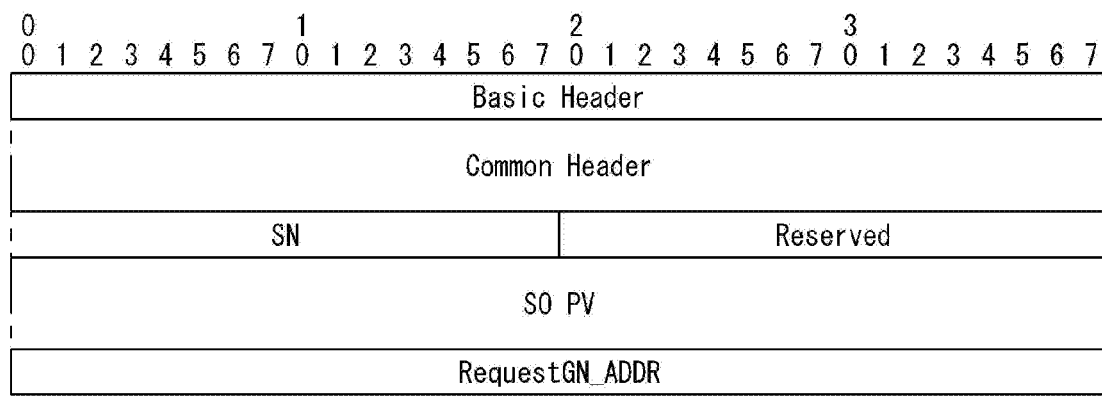
(a)
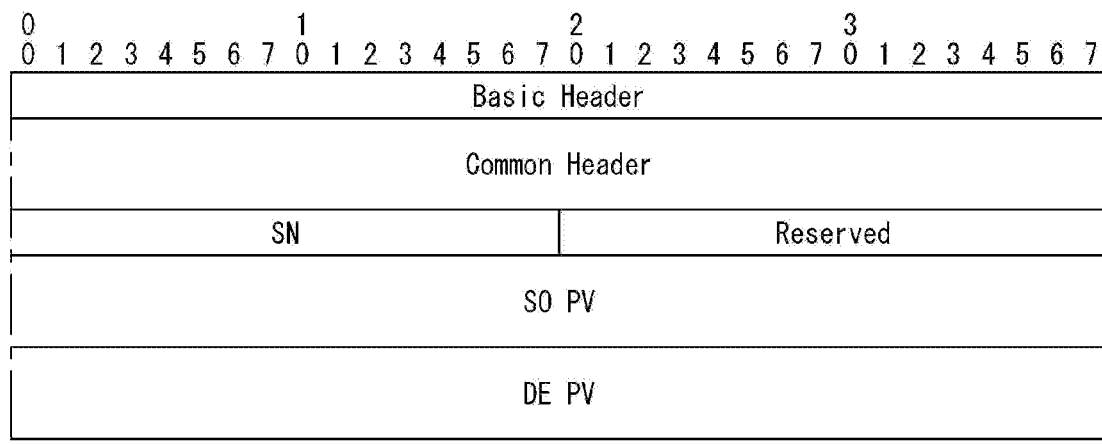
(b)

[FIG. 10]
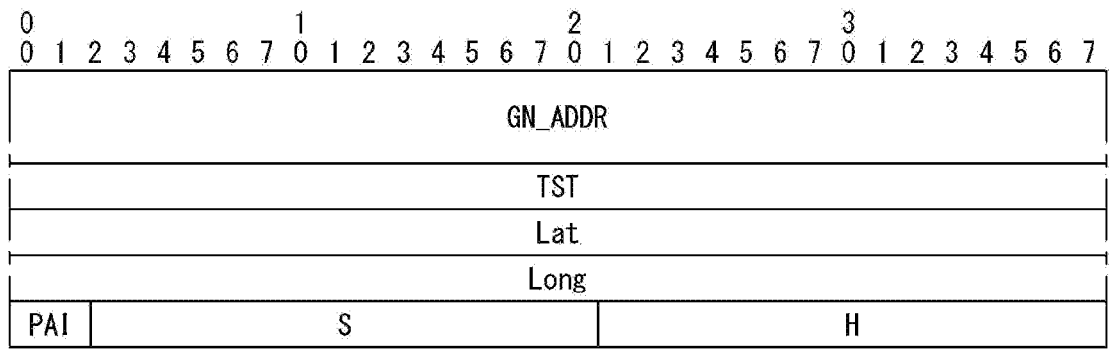
(a)
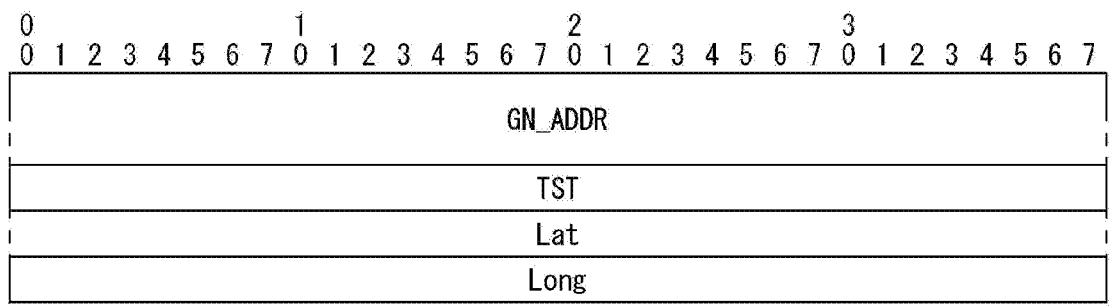
(b)
[FIG. 11]
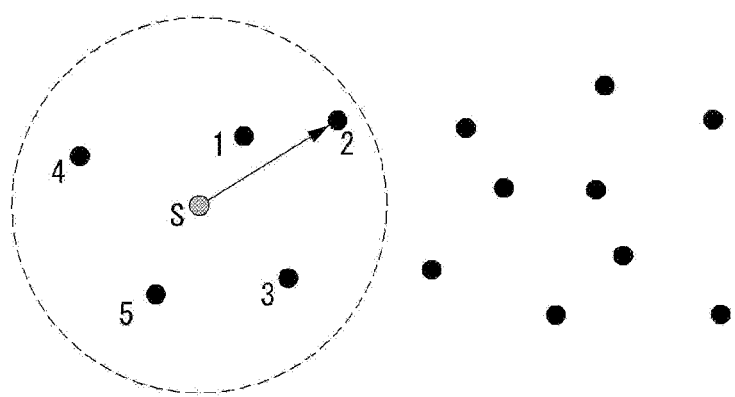

[FIG. 12]

```
1    — P is the GN packet to be forwarded
2    — i is the i - th LocTE
3    — NH is the LocTE idenfified as next hop, NH.LL_ADDR its link layer address
4    — NH_LL_ADDR is the link layer address of the next hop
5    — EPV is the ego position vector
6    — PV_P is the destination position vector in the GeoNetworking packet to be forwarded
7    — PV_I is the position vector of the i - th LocTE
8    — MFR indicates the progress according to the MFR policy
9    — B is the forwarding packet buffer
10       (UC forwarding buffer or BC forwarding buffer, depending on type of P)
11   — TC is the traffic class of the GN - Data.request (source operations)
12       or the field in the received Common header (forwarder operations)
13   MFR = DIST(PV_P , EPV)                     Initialize MFR
14   FOR (i LocT)
15       IF (i.IS_NEIGHBOUR) THEN          # LocTE i is neighbour
16           IF (DIST(PV_P, PV_I) < MFR) THEN
17               NH  ← i
18               MFR ← DIST(PV_P, PV_I)
19           ENDIF
20       ENDIF
21   ENDFOR
22   IF (MFR < DIST(PV_P, EPV)) THEN
23       SET NH_LL_ADDR  ← NH.LL_ADDR
24   ELSE                                       # Forwarder is at a local optimum
25       IF (TC.SCF_IS_ENABLED) THEN
26           ADD P TO B
27           SET NH_LL_ADDR ← 0                 # Indicates that packet is buffered
28       ELSE
29           SET NN_LL_ADDR ← BCAST             # No buffering allowed, fall back to BCAST
30       ENDIF
31   ENDIF
32   RETURN NH_LL_ADDR
```

[FIG. 13]

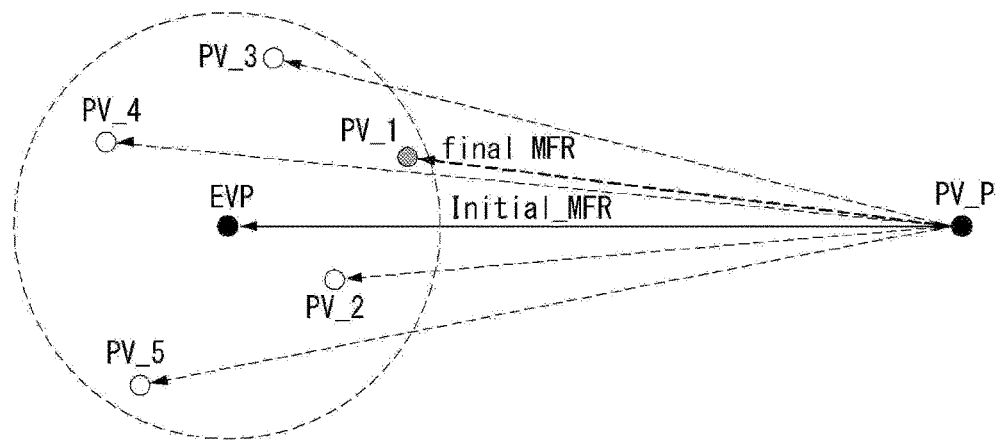

[FIG. 14]

```
1    -- P is the GN packet to be forwarded
2    -- i is the i - th LocTE
3    -- NH is the LocTE idenfified as next hop, NH.LL_ADDR its link layer address
4    -- NH_LL_ADDR is the link layer address of the next hop
5    -- EPV is the ego position vector
6    -- PV_P is the destination position vector in the GeoNetworking packet to be forwarded
7    -- PV_I is the position vector of the i - th LocTE
8    -- MFR indicates the progress according to the MFR policy
9    -- TH indicates threshold value which means updated number of positioning vector for some period.
10      NUM is the updated number of positioning vector for some period
11   -- B is the forwarding packet buffer
12      (UC forwarding buffer or BC forwarding buffer, depending on type of P)
13   -- TC is the traffic class of the GN - Data.request (source operations)
14      or the field in the received Common header (forwarder operations)
15   MFR = DIST(PV_P , EPV)                          Initialize MFR
16   FOR (i LocT)
17       IF (i.IS_NEIGHBOUR) THEN             # LocTE i is neighbour
18           IF (NUM > TH) THEN
19               IF (DIST(PV_P, PV_I) < MFR) THEN
20                   NH  <-  I
21                   MFR  <-  DIST(PV_P, PV_I)
22               ENDIF
23           ENDIF
24       ENDIF
25   ENDFOR
26   IF (MFR < DIST(PV_P, EPV)) THEN
27       SET NH_LL_ADDR  <-  NH.LL_ADDR
28   ELSE                                     # Forwarder is at a local optimum
29       IF (TC.SCF_IS_ENABLED) THEN
30           ADD P TO B
31           SET NH_LL_ADDR  <-  0            # Indicates that packet is buffered
32       ELSE
33           SET NN_LL_ADDR  <-  BCAST        # No buffering allowed, fall back to BCAST
34       ENDIF
35   ENDIF
36   RETURN NH_LL_ADDR
```

【FIG. 15】

```
1    -- P is the GN packet to be forwarded
2    -- i is the i - th LocTE
3    -- NH is the LocTE idenfified as next hop, NH.LL_ADDR its link layer address
4    -- NH_LL_ADDR is the link layer address of the next hop
5    -- EPV is the ego position vector
6    -- PV_P is the destination position vector in the GeoNetworking packet to be forwarded
7    -- PV_I is the position vector of the i - th LocTE
8    -- MFRR indicates the progress according to the MFRR policy
9    -- α and β are coefficient of distence and updated number
10      NUM is the updated number of positioning vector for some period
11   -- B is the forwarding packet buffer
12      (UC forwarding buffer or BC forwarding buffer, depending on type of P)
13   -- TC is the traffic class of the GN - Data.request (source operations)
14      or the field in the received Common header (forwarder operations)
15   MFRR = α*DIST(PV_P , EPV)                  Initialize MFR
16   FOR (i LocT)
17      IF (i.IS_NEIGHBOUR) THEN                 # LocTE i is neighbour
18         IF ((α*DIST(PV_P, PV_I) - β*NUM)< MFRR) THEN
19            NH ← I
20            MFRR ← α*DIST(PV_P, PV_I) - β*NUM
21         ENDIF
22      ENDIF
23   ENDFOR
24   IF (MFRR < α*DIST(PV_P, EPV)) THEN
25      SET NH_LL_ADDR ← NH.LL_ADDR
26   ELSE                                        # Forwarder is at a local optimum
27      IF (TC.SCF_IS_ENABLED) THEN
28         ADD P TO B
29         SET NH_LL_ADDR ← 0                    # Indicates that packet is buffered
30      ELSE
31         SET NN_LL_ADDR ← BCAST                # No buffering allowed, fall back to BCAST
32      ENDIF
33   ENDIF
34   RETURN NH_LL_ADDR
```

【FIG. 16】

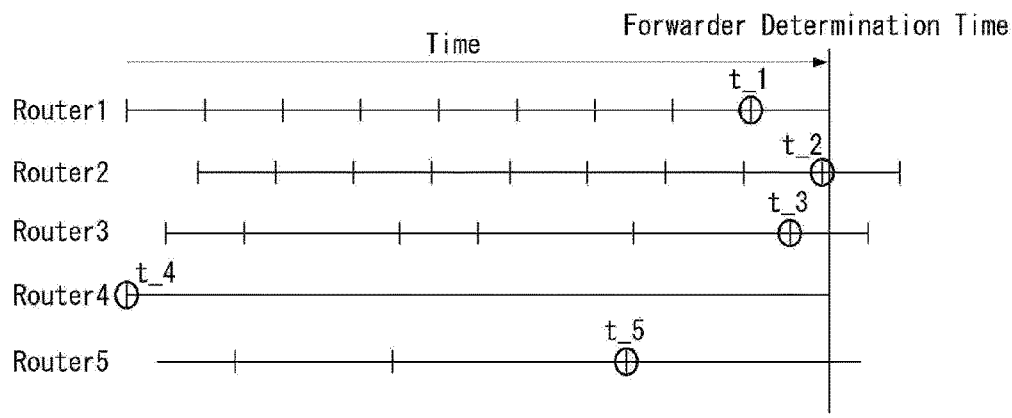

[FIG. 17]
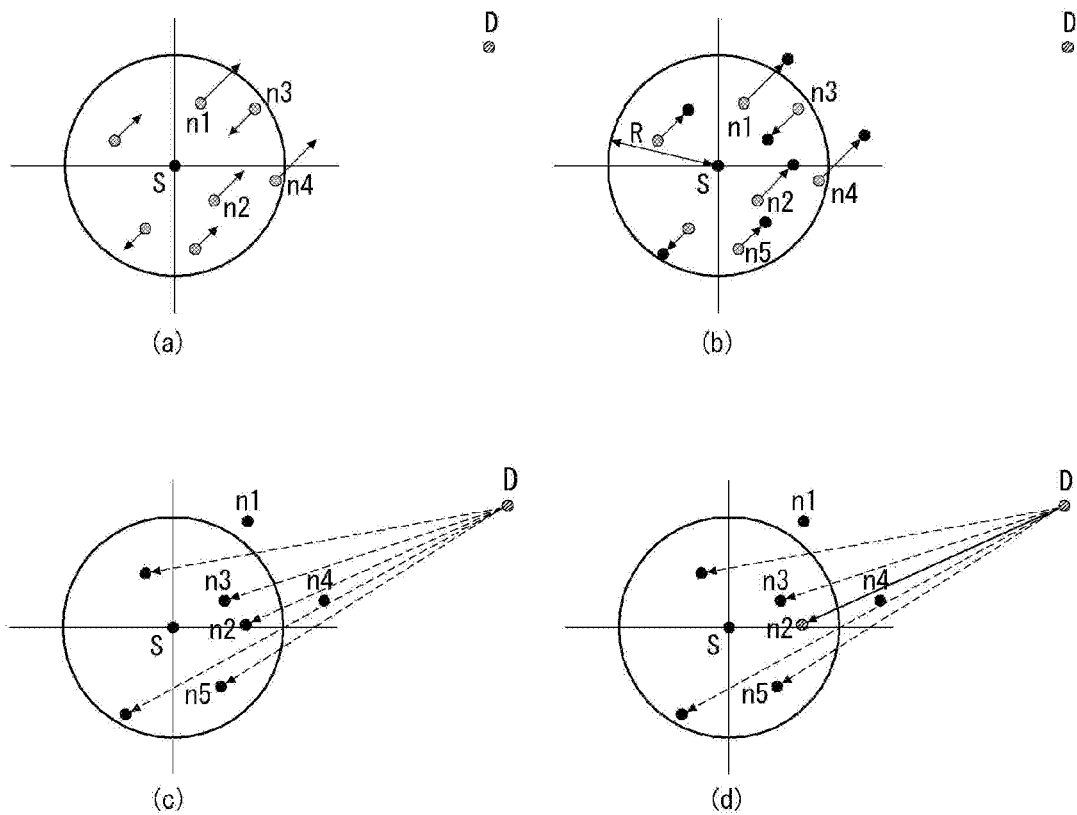

[FIG. 18]

```
1     — P is the GN packet to be forwarded
2     — i is the i - th LocTE
3     — R is the theoretical maximum communication range
4     — T is current time to calculate MFR
5     — t_i is updated time of the i_th LocTE
6     — NH is the LocTE idenfified as next hop, NH.LL_ADDR its link layer address
7     — NH_LL_ADDR is the link layer address of the next hop
8     — EPV is the ego position vector
9     — ESV is the ego velocity vector
10    — PV_P is the destination position vector in the GeoNetworking packet to be forwarded
11    — PV_I is the position vector of the i - th LocTE
12    — SV_I is the velocity vector of the i - th LocTE
13    — EST_PV_I is the estimated position vector of the i - th LocTE
14    — MFR indicates the progress according to the MFR policy
15    — B is the forwarding packet buffer
16       (UC forwarding buffer or BC forwarding buffer, depending on type of P)
17    — TC is the traffic class of the GN - Data.request (source operations)
18       or the field in the received Common header (forwarder operations)
19    MFR = DIST(PV_P , EPV)                              #Initialize MFR
20    FOR (i LocT)
21        IF (i.IS_NEIGHBOUR)AND(i.PAI = TRUE)) THEN     # LocTE i is neighbour
22            EST_PV_I = PV_I(t_i) + (T-t_i)* SV_I(t_i)  # Estimated position vector
23            IF (DIST(EPV,EST_PV_I) < R) THEN
24                IF (DIST(PV_P,EST_PV_I) < MFR) THEN
25                    NH ← I
26                    MFR ← DIST(PV_P, EST_PV_I)
27                ENDIF
28            ENDIF
29        ENDIF
30    ENDFOR
31    IF (MFR < DIST(PV_P, EPV)) THEN
32        SET NH_LL_ADDR ← NH.LL_ADDR
33    ELSE                                                # Forwarder is at a local optimum
34        IF (TC.SCF_IS_ENABLED) THEN
35            ADD P TO B
36            SET NH_LL_ADDR ← 0                         # Indicates that packet is buffered
37        ELSE
38            SET NN_LL_ADDR ← BCAST                     # No buffering allowed, fall back to BCAST
39        ENDIF
40    ENDIF
41    RETURN NH_LL_ADDR
```

【FIG. 19】
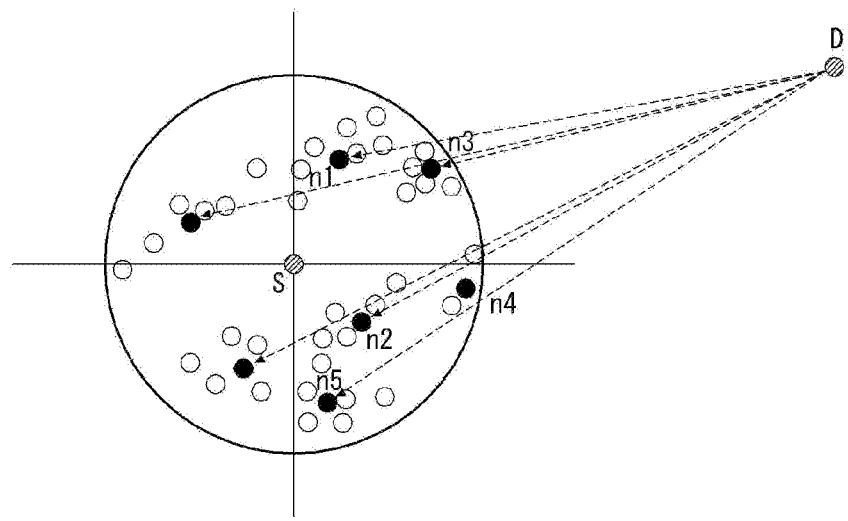
【FIG. 20】
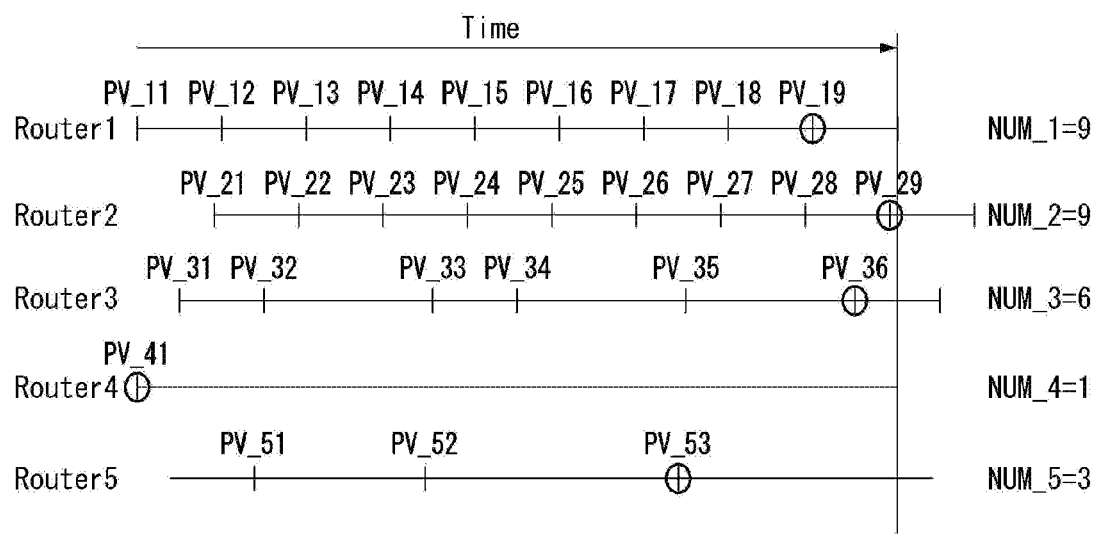

[FIG. 21]

```
1     — P is the GN packet to be forwarded
2     — i is the i - th LocTE
3     — j is the j-th updated position vector for some period
4     — NUM is the number of updated position vector for some period
5     — NUM_TH indicates threshold value which means minimum updated number of position vector for some period
6     — DIFFSUM indicates the sum of difference among updated position vector for some period
7     — VARIANCE indicates the variation
8     — NH is the LocTE idenfified as next hop, NH.LL_ADDR its link layer address
9     — NH_LL_ADDR is the link layer address of the next hop
10    — EPV is the ego position vector
11    — EPV_ij is the ego position vector at the same time of ij-th LocTE
12    — PV_P is the destination position vector in the GeoNetworking packet to be forwarded
13    — PV_I is the latest position vector of the i-th LocTE
14    — PV_F is the latest position vector of the potential selected forwarder
15    — PV_ij is the position vector of the ij-th LocTE
16    — RSF indicates the progress according to the RSF policy
17    — α and β are coefficient of distance and position vector variance
18    — B is the forwarding packet buffer
19      (UC forwarding buffer or BC forwarding buffer, depending on type of P)
20    — TC is the traffic class of the GN - Data.request (source operations)
21      or the field in the received Common header (forwarder operations)
22    FOR (i LocT)
23        i.DIFFSUM <- 0
24        IF(i.NUM > NUM_TH)
25            FOR(0 < j < i.NUM)
26                i.DIFFSUM <- i.DIFFSUM + abs(DIST(EPV_ij,PV_ij)-DIST(EPV_i(j+1),PV_i(j+1)))
27            ENDFOR
28            i.VARIANCE <- i.DIFFSUM/i.NUM
29        ELSE
30            i.VARIANCE <- MAX_VARIANCE
31        ENDIF
32    ENDFOR
33
34    RSF = α*DIST(PV_P,EPV) + β * MAX_VARIANCE        #Initialize RSF
35    FOR (i LocT)
36        IF (i.IS_NEIGHBOUR) THEN                    # LocTE i is neighbour
37            IF ((α * DIST(PV_P,PV_I) + β * i.VARIANCE) < RSF)THEN
38                NH <- i
39                PV_F <- PV_I
40                RSF <- α * DIST(PV_P, PV_I) + β * i.VARIANCE
41            ENDIF
42        ENDIF
43    ENDFOR
44    IF (DIST(PV_P,PV_F) < DIST(PV_P, EPV)) THEN
45        SET NH_LL_ADDR <- NH.LL_ADDR
46    ELSE                                            # Forwarder is at a local optimum
47        IF (TC.SCF_IS_ENABLED) THEN
48            ADD P TO B
49            SET NH_LL_ADDR <- 0                     # Indicates that packet is buffered
50        ELSE
51            SET NN_LL_ADDR <- BCAST                 # No buffering allowed, fall back to BCAST
52        ENDIF
53    ENDIF
54    RETURN NH_LL_ADDR
```

[FIG. 22]

```
1      — P is the GN packet to be forwarded
2      — i is the i - th LocTE
3      — j is the j-th updated position vector for some period
4      — NUM is the number of updated position vector for some period
5      — NUM_TH indicates threshold value which means minimum updated number of position vector for some period
6      — DIFFSUM indicates the sum of difference among updated position vector for some period
7      — VARIANCE indicates the variation
8      — NH is the LocTE idenfified as next hop, NH.LL_ADDR its link layer address
9      — NH_LL_ADDR is the link layer address of the next hop
10     — EPV is the ego position vector
11     — EPV_ij is the ego position vector at the same time of ij-th LocTE
12     — PV_P is the destination position vector in the GeoNetworking packet to be forwarded
13     — PV_I is the latest position vector of the i-th LocTE
14     — PV_F is the latest position vector of the potential selected forwarder
15     — PV_ij is the position vector of the ij-th LocTE
16     — RSF indicates the progress according to the RSF policy
17     — α and β are coefficient of distance and position vector variance
18     — Y is coefficient of the position difference from EPV
19     — B is the forwarding packet buffer
20       (UC forwarding buffer or BC forwarding buffer, depending on type of P)
21     — TC is the traffic class of the GN - Data.request (source operations)
22       or the field in the received Common header (forwarder operations)
23     FOR (i LocT)
24         i.DIFFSUM < - 0
25         IF(i.NUM > NUM_TH)
26             FOR(0 < j < i.NUM)
27                 i.DIFFSUM < - i.DIFFSUM + Y(j) * abs(DIST(EPV_ij,PV_ij)-DIST(EPV_i(j+1),PV_i(j+1)))
28             ENDFOR
29             i.VARIANCE < - i.DIFFSUM/i.NUM
30         ELSE
31             i.VARIANCE < - MAX_VARIANCE
32         ENDIF
33     ENDFOR
34
35     RSF = α*DIST(PV_P,EPV) + β * MAX_VARIANCE           #Initialize RSF
36     FOR (i LocT)
37         IF (i.IS_NEIGHBOUR) THEN                        # LocTE i is neighbour
38             IF ((α * DIST(PV_P,PV_I) + β * i.VARIANCE) < RSF)THEN
39                 NH ← i
40                 PV_F < - PV_I
41                 RSF ← α * DIST(PV_P, PV_I) + β * i.VARIANCE
42             ENDIF
43         ENDIF
44     ENDFOR
45     IF (DIST(PV_P,PV_F) < DIST(PV_P, EPV)) THEN
46         SET NH_LL_ADDR ← NH.LL_ADDR
47     ELSE                                                # Forwarder is at a local optimum
48         IF (TC.SCF_IS_ENABLED) THEN
49             ADD P TO B
50             SET NH_LL_ADDR ← 0                          # Indicates that packet is buffered
51         ELSE
52             SET NN_LL_ADDR ← BCAST                      # No buffering allowed, fall back to BCAST
53         ENDIF
54     ENDIF
55     RETURN NH_LL_ADDR
```

[FIG. 23]
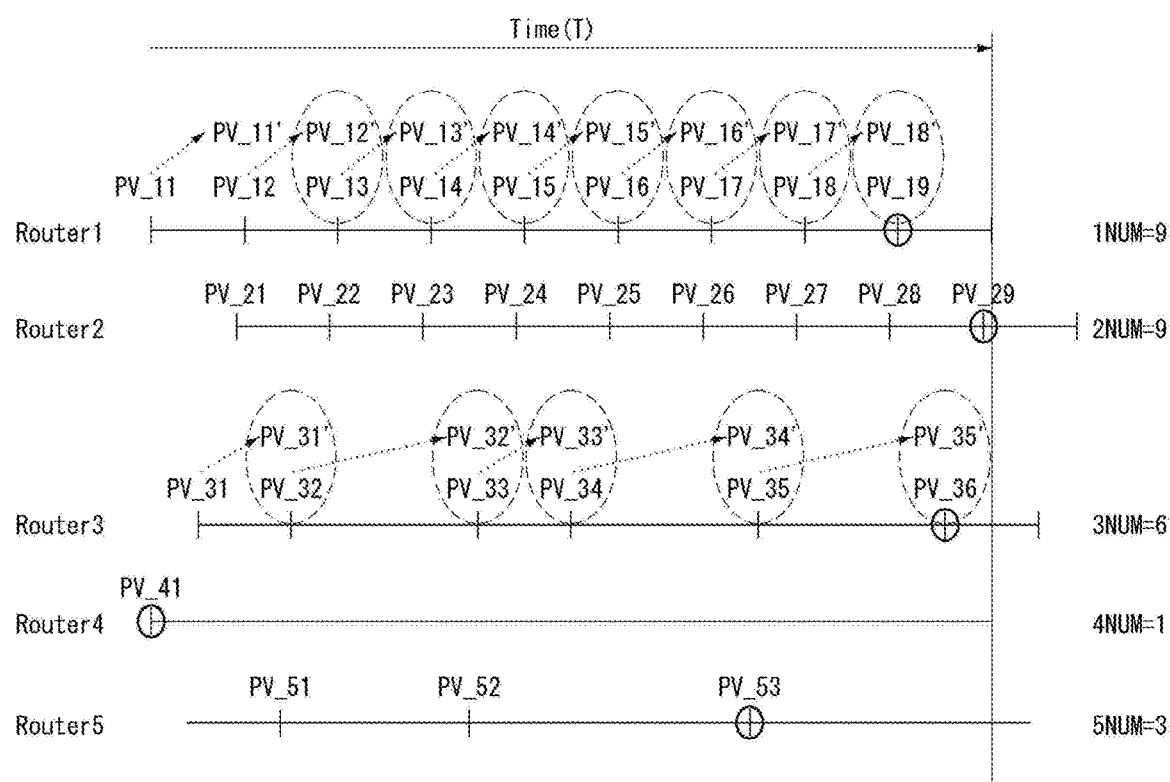

[FIG. 24]

```
1     — P is the GN packet to be forwarded
2     — i is the i - th LocTE
3     — i.PAI is the position accuracy indicator of the i-the LocTE
4     — DIFF is the difference between the estimated position vector and real position vector
5     — DIFFSUM is the DIFF value summation for some period
6     — t_ij is packet time stamp value at the ij-th LocTE
7     — NH is the LocTE idenfified as next hop, NH.LL_ADDR its link layer address
8     — NH_LL_ADDR is the link layer address of the next hop
9     — EPV is the ego position vector
10    — PV_P is the destination position vector in the GeoNetworking packet to be forwarded
11    — PV_I is the latest position vector of the i-th LocTE
12    — PV_F is the latest position vector of the potential selected forwarder
13    — PV_ij is the position vector of the ij-th LocTE
14    — EST_PV_ij is the estimated position vector of the ij_th LocTE
15    — SV_ij is the velocity vector of the ij_th LocTE
16    — α and β are coefficient of distence and the difference sum
17    — Y is a coefficient of the position difference between estimated position vector and real position vector
18    — B is the forwarding packet buffer
19      (UC forwarding buffer or BC forwarding buffer, depending on type of P)
20    — TC is the traffic class of the GN - Data.request (source operations)
21      or the field in the received Common header (forwarder operations)
22
23    FOR (i LocT)
24        IF (i.IS_NEIGHBOUR)AND(i.PAI = TRUE)) THEN           # LocTE i is neighbour
25            i.DIFFSUM <- 0
26            FOR(0 < j < i.NUM)
27                EST_PV_i(j+1) <- PV_ij + (t_i(j+1)-t_ij)* SV_ij    # Estimated position vector
28                DIFF <- DIST(EST_PV_i(j+1) PV_i(j+1))              # Position difference between estimated and real position vector
29                i.DIFFSUM <- i.DIFFSUM + Y(j)*DIFF                 # Summation of position difference
30            ENDFOR
31        ENDIF
32    ENDFOR
33
34    RSF = α*DIST(PV_P,EPV) + β * MAX_VARIANCE        #Initialize RSF
35    FOR (i LocT)
36        IF (i.IS_NEIGHBOUR) THEN                              # LocTE i is neighbour
37            IF ((α * DIST(PV_P,PV_I) + β * i.DIFFSUM) < RSF) THEN
38                NH <- i
39                PV_F <- PV_I
40                RSF <- α * DIST(PV_P, PV_I) + β * i.DIFFSUM
41            ENDIF
42        ENDIF
43    ENDFOR
44    IF (DIST(PV_P,PV_F) < DIST(PV_P, EPV)) THEN
45        SET NH_LL_ADDR <- NH.LL_ADDR
46    ELSE                                              # Forwarder is at a local optimum
47        IF (TC.SCF_IS_ENABLED) THEN
48            ADD P TO B
49            SET NH_LL_ADDR <- 0                       # Indicates that packet is buffered
50        ELSE
51            SET NN_LL_ADDR <- BCAST                   # No buffering allowed, fall back to BCAST
52        ENDIF
53    ENDIF
54    RETURN NH_LL_ADDR
```

[FIG. 25]
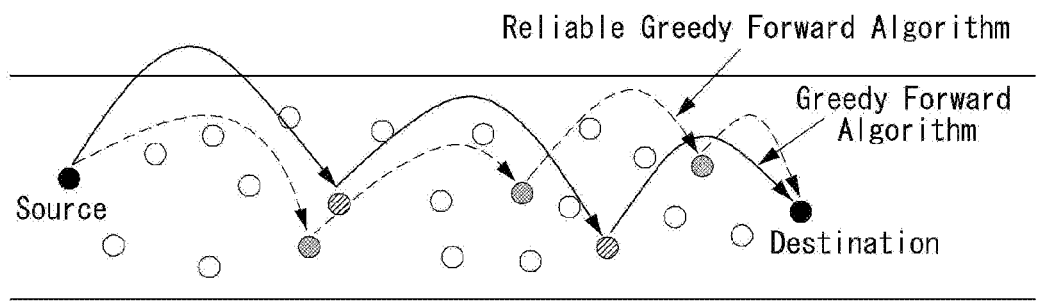
[FIG. 26]
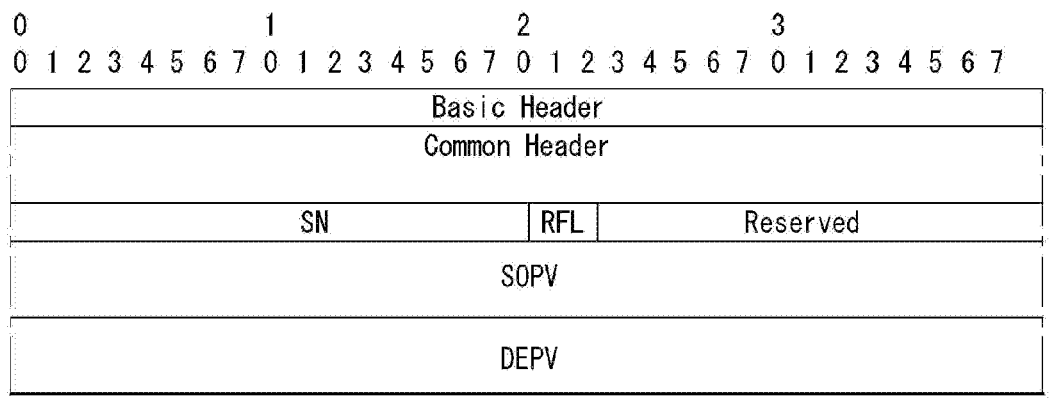
[FIG. 27]
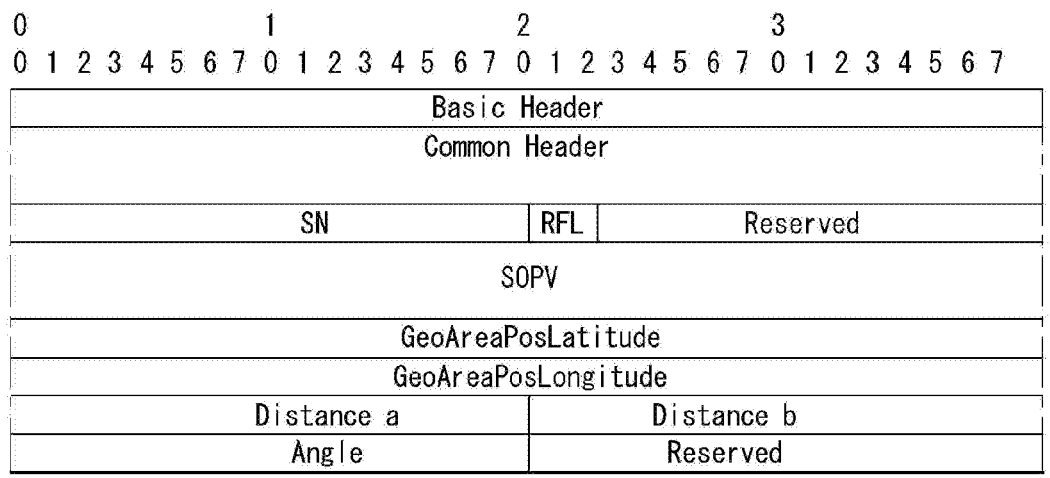

[FIG. 28]
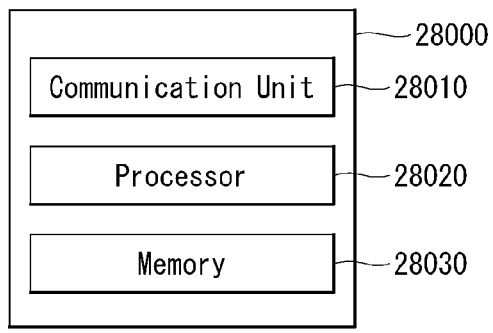
[FIG. 29]
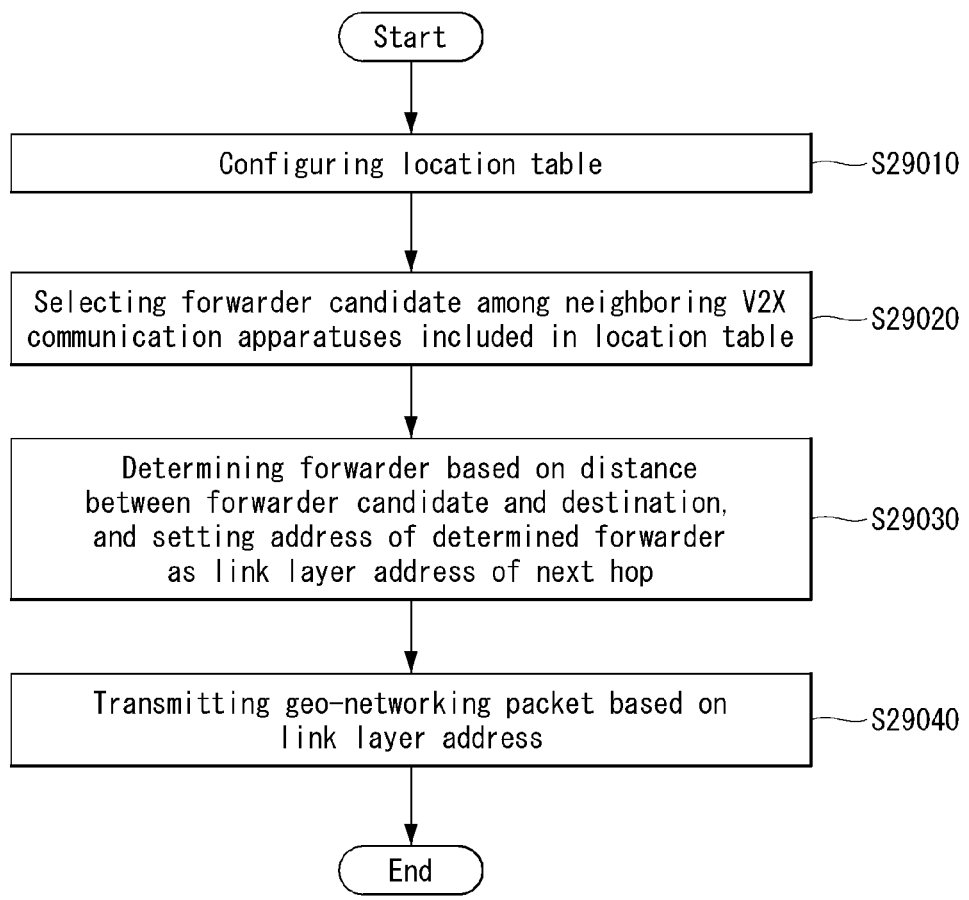

V2X COMMUNICATION DEVICE AND GEO-NETWORKING TRANSMISSION METHOD

This application is the National Stage filing under 35 U.S.C. 371 of International Application No. PCT/KR2017/008613, filed on Aug. 9, 2017, the contents of which are all hereby incorporated by reference herein in their entirety.

TECHNICAL FIELD

The present disclosure relates to an apparatus for a V2X communication and geo-networking transmission method thereof, and, more particularly, to a forwarding algorithm that may forward data out of transmission range reliably.

BACKGROUND ART

In recent years, vehicles have become a result of complex industrial technology, which is a fusion of electric, electronic and communication technologies, from centering on mechanical engineering, and the vehicle is also called a smart car in such an aspect. Smart cars have been providing various customized mobile services as well as traditional vehicle technology such as traffic safety/complicatedness by connecting drivers, vehicles, and transportation infrastructures. The connectivity may be implemented using vehicle to everything (V2X) communication technology.

DISCLOSURE

Technical Problem

Various services can be provided through a V2X communication. Furthermore, multiple frequency bands are used for providing the various services. Even in such an environment, highly reliable forwarding and providing of safety services are very important matters considering the characteristics of a V2X communication.

In order to transmit data out of transmission range, a geo-networking transmission method that uses hopping may be used. In a geo-networking transmission, a packet forwarding algorithm may be used for data hopping and forwarding it to a destination. Particularly, in a V2X communication environment in which a communication environment changes dynamically, efficiency and reliability need to be considered for the packet forwarding algorithm.

Technical Solution

In order to solve the above technical problem, a geo-networking transmission method of a V2X communication apparatus according to an embodiment of the present disclosure includes configuring location information, wherein the location information includes information on a V2X communication apparatus executing a geo-networking protocol; selecting a forwarder candidate among neighboring V2X communication apparatuses included in the location table; determining a forwarder based on a distance between the forwarder candidate and a destination, and setting an address of the determined forwarder as a link layer address of a next hop; and transmitting a geo-networking packet based on the link layer address.

In a V2X communication method according to an embodiment of the present disclosure, the location information may include at least one of geo-network address information, link layer address information, type information, and position vector information on at least one of the neighboring V2X communication apparatuses from which the V2X communication apparatus receives the geo-networking packet.

In a V2X communication method according to an embodiment of the present disclosure, the selecting the forwarder candidate may be performed based on an updated number of the position vector of the neighboring V2X communication apparatus.

In a V2X communication method according to an embodiment of the present disclosure, the selecting the forwarder candidate may further include estimating a current location of the neighboring V2X communication apparatus; and selecting the forwarder candidate based on the estimated current location, an effective communication range, and a distance to a destination of the neighboring V2X communication apparatus.

In a V2X communication method according to an embodiment of the present disclosure, the selecting the forwarder candidate may further include obtaining a reliability value of the neighboring V2X communication apparatus; and selecting the forwarder candidate based on the reliability value.

In a V2X communication method according to an embodiment of the present disclosure, the reliability value may be obtained based on an updated number of the position vector for the neighboring V2X communication apparatus, and an amount of change in a distance between the V2X communication apparatus and the neighboring V2X communication apparatus.

In a V2X communication method according to an embodiment of the present disclosure, the geo-networking packet may include forwarder level information indicating whether the geo-networking packet is transmitted to the most forwardable router or to a second forwardable router.

In order to solve the above technical problem, a V2X communication apparatus according to an embodiment of the present disclosure includes a memory for storing data; a communication unit for transmitting and receiving a radio signal including a geo-networking packet; and a processor controlling the memory and the communication unit, wherein the processor is configured to configure location information, wherein the location information includes information on a V2X communication apparatus executing a geo-networking protocol, select a forwarder candidate among neighboring V2X communication apparatuses included in the location table, determine a forwarder based on a distance between the forwarder candidate and a destination, and setting an address of the determined forwarder as a link layer address of a next hop, and transmit a geo-networking packet based on the link layer address.

In a V2X communication apparatus according to an embodiment of the present disclosure, the location information may include at least one of geo-network address information, link layer address information, type information, and position vector information on at least one of the neighboring V2X communication apparatuses from which the V2X communication apparatus receives the geo-networking packet.

In a V2X communication apparatus according to an embodiment of the present disclosure, the selecting the forwarder candidate may be performed based on an updated number of the position vector of the neighboring V2X communication apparatus.

In a V2X communication apparatus according to an embodiment of the present disclosure, the selecting the forwarder candidate may be performed by estimating a current location of the neighboring V2X communication apparatus, and selecting the forwarder candidate based on the estimated current location, an effective communication range, and a distance to a destination of the neighboring V2X communication apparatus.

In a V2X communication apparatus according to an embodiment of the present disclosure, the selecting the forwarder candidate may be performed by obtaining a reliability value of the neighboring V2X communication apparatus, and selecting the forwarder candidate based on the reliability value.

In a V2X communication apparatus according to an embodiment of the present disclosure, the reliability value may be obtained based on an updated number of the position vector for the neighboring V2X communication apparatus, and an amount of change in a distance between the V2X communication apparatus and the neighboring V2X communication apparatus.

In a V2X communication apparatus according to an embodiment of the present disclosure, the geo-networking packet may include forwarder level information indicating whether the geo-networking packet is transmitted to the most forwardable router or to a second forwardable router.

Advantageous Effects

According to the present disclosure, it is possible to provide reliable geo-networking transmission for a dynamic communication environment. A greedy forwarding algorithm, which determines and forwards forwarders without using buffers and timers, has a high transmission speed, but may make transmission impossible if the forwarder temporarily disappears from the communication range. The present disclosure does not merely determine the router closest to the destination among the routers within the communication range, but can significantly improve the transmission reliability based on the updated number of the location information, the estimated current location, and the reliability. In other words, according to the present disclosure, it is possible to significantly lower the risk of forwarding failure while maintaining the advantages of rapid forwarding of greedy forwarding.

DESCRIPTION OF DRAWINGS

The accompany drawings, which are included to provide a further understanding of the present disclosure and are incorporated on and constitute a part of this specification illustrate embodiments of the present disclosure and together with the description that serves to describe the principles of the present disclosure.

FIG. 1 illustrates a protocol structure of an ITS system according to an embodiment of the present disclosure.

FIG. 2 illustrates a packet structure of a network/transport layer according to an embodiment of the present disclosure.

FIG. 3 illustrates a header structure of a geo-networking packet according to an embodiment of the present disclosure.

FIG. 4 illustrates a geo-networking type and a header configuration thereof according to an embodiment of the present disclosure.

FIG. 5 illustrates a geo-networking type and a header configuration thereof according to another embodiment of the present disclosure.

FIG. 6 illustrates a geo-networking type and a header configuration thereof according to another embodiment of the present disclosure.

FIG. 7 illustrates a geo-networking type and a header configuration thereof according to another embodiment of the present disclosure.

FIG. 8 illustrates a geo-networking type and a header configuration thereof according to another embodiment of the present disclosure.

FIG. 9 illustrates a configuration of Location Service (LS) request and LS reply type packets according to an embodiment of the present disclosure.

FIG. 10 illustrates position vector information according to an embodiment of the present disclosure.

FIG. 11 illustrates a packet forwarding method of a greedy forwarding algorithm according to an embodiment of the present disclosure.

FIG. 12 illustrates a pseudo code showing a greedy forwarding algorithm according to an embodiment of the present disclosure.

FIG. 13 illustrates a greedy forwarding algorithm according to an embodiment of the present disclosure.

FIG. 14 is a pseudo code showing a greedy forwarding algorithm using an updated number of location information according to an embodiment of the present disclosure.

FIG. 15 is a pseudo code showing a greedy forwarding algorithm using an updated number of location information according to another embodiment of the present disclosure.

FIG. 16 illustrates an update time of LocTE for each router for estimating a moving location of a router according to an embodiment of the present disclosure.

FIG. 17 illustrates a method for estimating a location of a router according to an embodiment of the present disclosure.

FIG. 18 is a pseudo code showing a greedy forwarding algorithm using location estimation of a router according to an embodiment of the present disclosure.

FIG. 19 illustrates locations and updated numbers observed for neighboring routers for T time based on a sender router according to an embodiment of the present disclosure.

FIG. 20 illustrates a position vector and an updated number for each router updated in a location table according to an embodiment of the present disclosure.

FIG. 21 illustrates a pseudo code showing a greedy forwarding algorithm using a reliability function according to an embodiment of the present disclosure.

FIG. 22 illustrates a pseudo code showing a greedy forwarding algorithm using a reliability function according to another embodiment of the present disclosure.

FIG. 23 illustrates a greedy forwarding transmission method using a reliability function according to another embodiment of the present disclosure.

FIG. 24 illustrates a pseudo code showing a greedy forwarding algorithm using a reliability function according to the embodiment of FIG. 23.

FIG. 25 illustrates a packet transmission method using RSF according to an embodiment of the present disclosure.

FIGS. 26 and 27 illustrate a geo-networking packet header according to an embodiment of the present disclosure.

FIG. 28 illustrates a configuration of a V2X communication apparatus according to an embodiment of the present disclosure.

FIG. 29 is a flowchart illustrating a geo-networking transmission method according to an embodiment of the present disclosure.

BEST MODE FOR INVENTION

Preferred embodiments of the present disclosure are described in detail and examples thereof are illustrated in the accompanying drawings. The following detailed description with reference to the accompanying drawings is intended to illustrate the preferred embodiments of the present disclosure rather than merely illustrating embodiments that may be implemented according to embodiments of the present disclosure. The following detailed description includes details in order to provide a thorough understanding of the present disclosure, but the present disclosure does not require all these details. In the present disclosure, respective embodiments described below need not be particularly used separately. Multiple embodiments or all embodiments may be used together, and specific embodiments may be used as a combination.

Most of the terms used in the present disclosure are selected from the general ones that are widely used in the field, but some terms are arbitrarily selected by the applicant and the meaning thereof will be described in detail in the following description as necessary. Accordingly, the invention should be understood based on the intended meaning of the term rather than the mere name or meaning of the term.

The present disclosure relates to a V2X communication apparatus and the V2X communication apparatus is included in an Intelligent Transport System (ITS) to perform all or some functions of the ITS. The V2X communication apparatus may communicate with vehicles and vehicles, vehicles and infrastructure, vehicles and bicycles, and mobile devices. The V2X communication apparatus may be abbreviated as a V2X apparatus. As an embodiment, the V2X apparatus may correspond to an on board unit (OBU) of the vehicle or may be included in the OBU. The OBU may also be referred to as on a board equipment (OBE). The V2X apparatus may correspond to a road side unit (RSU) of the infrastructure or may be included in the RSU. The RSU may also be referred to as a road side equipment (RSE). Alternatively, the V2X communication apparatus may correspond to an ITS station or may be included in the ITS station. All of a predetermined OBU, a predetermined RSU, and a predetermined mobile equipment that perform V2X communication may also be referred to as the ITS station or the V2X communication apparatus. In the geo-networking communication, the V2X communication apparatus may also be referred to as a router.

The V2X communication apparatus may communicate based on various communication protocols. The V2X communication apparatus may implement Wireless Access In Vehicular Environments (WAVE) protocol of IEEE 1609.1-4 standard.

The V2X communication apparatus may transmit a Cooperative Awareness Message (CAM) or a Decentralized Environmental Notification Message (DENM). The CAM is distributed in an ITS network and provides information of at least one of a presence, a position, a communication state or an operation state of an ITS station. The DENM provides information for a detected event. The DEMN may provide information for an arbitrary driving situation or event which is detected by an ITS station. For example, the DENM may provide information for situations such as an emergency electronic brake lamp, a vehicle accident, a vehicle problem, a traffic condition, and the like.

FIG. 1 illustrates a protocol structure of an ITS system according to an embodiment of the present disclosure.

Application layer: The application layer may implement and support various use cases. For example, an application may provide road safety, efficient traffic information, and other application information.

Facilities layer: The facility layer may support various use-cases defined in the application layer so as to effectively implement various use-cases. For example, the facility layer may perform application support, information support, and session/communication support.

Access layer: The access layer may transmit messages/data received by the upper layer through a physical channel. For example, the access layer may perform/support data communication based on IEEE 802.11 and/or 802.11p standard-based communication technology, ITS-G5 wireless communication technology based on physical transmission technology of the IEEE 802.11 and/or 802.11p standards, 2G/3G/4G (LTE)/5G wireless cellular communication technology including satellite/broadband wireless mobile communication, broadband terrestrial digital broadcasting technology such as DVB-T/T2/ATSC, GPS technology, IEEE 1609 WAVE technology, and the like.

Networking & Transport layer: The network/transport layer may configure a network for vehicle communication between homogeneous/heterogeneous networks by using various transport protocols and network protocols.

The transport layer corresponds to a connection layer between services providing upper layers (session layer, presentation layer and application layer) and lower layers (network layer, data link layer and physical layer). The transport layer serves to manage data sent by a user to accurately arrive at a destination. At a transmitting side, the transport layer may serve to split data into packets having an appropriate size for transmission for efficient data transmission. At a receiving side, the transport layer may serve to recombine the received packets into an original file. As an embodiment, the transport protocol may adopt Transmission Control Protocol (TCP), User Datagram Protocol (UDP) and Basic Transport Protocol (BTP) as a transport protocol.

The network layer may manage a logical address and decide a packet transfer path. The network layer may receive a packet generated in the transport layer and add the logical address of the destination in a network layer header. As an embodiment of a packet path, unicast/broadcast may be considered between vehicles, between a vehicle and a fixation station, and between fixation stations. As an embodiment, as the network protocol, a geo-networking, IPv6 networking with mobility support, IPv6 over geo-networking, or the like may be considered.

The ITS architecture may further include a management layer and a security layer.

FIG. 2 illustrates a packet structure of a network/transport layer according to an embodiment of the present disclosure.

The transport layer may generate a BTP packet, and the network layer may generate a geo-networking packet. The geo-networking packet may be encapsulated into an LLC packet. In an embodiment of FIG. 2, the data may include a message set, and the message set may become a basic safety message.

The BTP is a protocol for transmitting the message such as the CAM or DENM generated by the facility layer to the lower layer. The BTP header includes A type and B type. The A type BTP header may include a destination port and a source port required for transmission/reception for interactive packet transmission. The B type BTP header may include the destination port and destination port information required for transmission for non-interactive packet transmission. The description of a field/information included in the header is as follows.

Destination port: The destination port identifies a facility entity corresponding to the destination of data (BTP-PDU) included in the BTP packet.

Source port: As a field generated in the case of BTP-A type, the Source port indicates a port of a protocol entity of the facility layer in a source in which the corresponding packet is transmitted. This field may have a size of 16 bits.

Destination port Information: As a field generated in the case of BTP-B type, the Destination port information may provide additional information when the destination port is a most well-known port. This field may have the size of 16 bits.

The geo-networking packet includes a basic header and a common header according to the protocol of the network layer and optionally includes an extension header according to a geo-networking mode. The geo-networking header will be described below again.

An LLC header is added to the geo-networking packet to generate the LLC packet. The LLC header provides a function to distinguish and transmit IP data from geo-networking data. The IP data and the geo-networking data may be distinguished by Ether-type of SNAP. As an embodiment, when the IP data is transmitted, the Ether-type may be set to x86DD and included in the LLC header. As an embodiment, when the geo-networking data is transmitted, the Ether-type may be set to x86DC and included in the LLC header. The receiver may verify the Ether-type field of the LLC packet header and forward and process the packet to an IP data path or a geo networking path according to the value.

FIG. 3 illustrates a header structure of a geo-networking packet according to an embodiment of the present disclosure.

FIG. 3(a) shows the basic header of the geo-networking packet header shown in FIG. 2, and FIG. 3(b) shows the common header of the geo-networking packet header shown in FIG. 2.

The basic header may be 32 bits (4 bytes). The basic header may include at least one of a version field, a next header (NH) field, a lifetime (LT) field, and a remaining hop limit (RHL) field. The description of the fields included in the basic header is as follows. A bit size configuring each field is just an embodiment and may be modified.

Version (4 bits): A version field indicates a version of the geo-networking protocol.

NH (4 bits): A next header (NH) field indicates a type of subsequent header/field. When a field value is 1, the common header may be followed and when the field value is 2, a secured packet in which the security is configured may be followed.

LT (8 bits): A lifetime (LT) field indicates a maximum survival time of the corresponding packet.

RHL (8 bits): A remaining hop limit (RHL) field indicates a remaining hop limit. An RHL field value may be reduced by one for each forwarding on a GeoAdhoc router. When the RHL field value is 0, the corresponding packet is not forwarded any longer.

The common header may be 64 bits (8 bytes). The common header may include at least one of a next header (NH) field, a header type (HT) field, a header sub-type (HST) field, a header sub-type (HST) field, a traffic class (TC) field, a flags field, a payload length (PL) field, and a maximum hop limit (MHL) field. The description of each of the fields is as follows.

NH (4 bits): The next header (NH) field indicates the type of subsequent header/field. When the field value is 0, the NH field may indicate "ANY" type which is not defined, when the field value is 1, the NH field may indicate a BTP-A type packet, when the field value is 2, the NH field may indicate a BTP-B type, and when the field value is 3, the NH field may indicate an IP diagram of IPv6.

HT (4 bits): The header type field indicates a geo-networking type. The geo-networking type includes Beacon, GeoUnicast, GeoAnycast, GeoBroadcast, Topologically-Scoped Broadcast (TSB), and Location Service (LS).

HST (4 bits): The header sub type field indicates a detailed type together with the header type. As an embodiment, when the HT type is set to the TSB, the HST may indicate a single hop for the HST value of '0' and a multi-hop for the HST value of '1'.

TC (8 bits): The traffic class field may include Store-Carry-Forward (SCF), channel offload, and TC ID. The SCF field indicates whether to store the packet when there is no neighbor to which the packet is to be transferred. The channel offload field indicates that the packet may be transferred to another channel in the case of a multi-channel operation. The TC ID field as a value allocated when transferring the packet in the facility layer may be used for setting a contention window value in the physical layer.

Flag (8 bits): The flag field indicates whether the ITS apparatus is mobile or stationary and as an embodiment, the flag field may become last 1 bit.

PL (8 bits): The payload length field indicates a data length subsequent to the geo-networking header in units of bytes. For example, in the case of the geo-networking packet that carries the CAM, the PL field may indicate the BTP header and the length of the CAM.

MHL (8 bits): The Maximum Hop Limit (MHL) field may indicate a maximum hopping number.

The geo-networking header includes the basic header, the common header and the extended header. A configuration of the extended header changes depending on a type of the geo-networking. Hereinafter, a header configuration depending on each type of the geo-networking will be described.

In the present disclosure, a V2X communication apparatus that performs the geo-networking may be referred to as a router or a GeoAdhoc router. A V2X communication apparatus that transmits a geo-networking packet may be referred to as a source router or a sender. A V2X communication apparatus that receives a geo-networking packet from the source router and relays/forwards it to the sender may be referred to as a forwarding router or a forwarder. In addition, a V2X communication apparatus, which is a final destination of the geo-networking packet or a V2X communication apparatus of a final destination region may be referred to as a destination or a destination router.

FIG. 4 illustrates a geo-networking type and a header configuration thereof according to an embodiment of the present disclosure.

FIG. 4(a) shows a data forwarding method of Geographically-Scoped Unicast (GUC) type, and FIG. 4(b) shows a GUC header configuration.

GUC is a method for forwarding data from a specific source router to a destination router. As shown in FIG. 4(a), a source router S may transmit data to a destination router N8 with GUC type via a multi-hop. The source router needs to have information of the destination router in a location table. In the case that there is no information of the destination router, the source router may find a desired destination by using "LS request and LS reply" process.

In FIG. 4(b), a GUC packet header includes a basic header, a common header and an extended header. HT field of the common header indicates GUC, and the extended header includes SN field, Source Position Vector (SO PV) field and Destination Position Vector (DE PV) field. The description for the fields included is as below.

Sequence Number (SN): A Sequence Number field indicates a value used for examining a packet redundancy. A value of the Sequence Number field is increased by 1 when a source transmits a packet. A reception router may use a sequence number (or sequence number and TST value) and may determine whether a packet is redundantly received. The SN is a value used in multi-hop transmission.

SO PV: A SO PV represents a position of source and may be a long position vector format.

DE PV: A DE PV represents a position of destination and may be a short position vector format.

FIG. 5 illustrates a geo-networking type and a header configuration thereof according to another embodiment of the present disclosure.

FIG. 5(a) shows a data forwarding method of Topologically Scoped Broadcast (TSB) type, and FIG. 5(b) shows a TSB header configuration.

TSB is a broadcast scheme in which a distance that data is forwarded is adjusted by the number of hops. Information based on a position is not used. Since it is determined whether to forward data only with the number of hops, a position address of a destination or local information to which data is forwarded is not used. Data may be forwarded to all routers within n hops from the source router S.

FIG. 5(a) shows a data transmission of TSB scheme of n=2. The source router may broadcast a signal by setting n=2, and the routers within a transmission range of the source router receive the signal. Since n=2, forwarding routers N1, N2 and N3 that receive data with 1 hop re-broadcast the reception packet. Since N=2, the routers that receive the re-broadcasted signal do not re-broadcast the reception packet. In the TSB transmission method, the case of a single hop (n=1) may be referred to Single Hop Broadcast (SHB).

In FIG. 5(b), a TSB packet header includes a basic header, a common header and an extended header. HT field of the common header indicates TSB, and the extended header includes SN field and Source Position Vector (SO PV) field. The description for the fields included is as below.

Sequence Number (SN): A Sequence Number field indicates a value used for examining a packet redundancy. A value of the Sequence Number field is increased by 1 when a source transmits a packet. A reception router may use a sequence number (or sequence number and TST value) and may determine whether a packet is redundantly received. The SN is a value used in multi-hop transmission.

SO PV: A SO PV represents a position of source and may be a long position vector format.

In the case of the TSB header, since a transmission count is limited by the number of hops, a destination address may be omitted.

FIG. 6 illustrates a geo-networking type and a header configuration thereof according to another embodiment of the present disclosure.

FIG. 6(a) shows a data forwarding method of Single Hop Broadcast (SHB) type, and FIG. 6(b) shows a SHB header configuration.

SHB corresponds to the case that the number of hops is 1 (n=1) in the TSB described above. A SHB packet is transmitted only to the router within a transmission range of a source router. Since data may be transmitted with the smallest latency, SHB may be used for a safety massage transmission such as CAM. As shown in FIG. 6(a), a packet is transmitted only to the routers N1, N2 and N3 within the range of 1 hop of the source S.

In FIG. 6(b), a SHB packet header includes a basic header, a common header and an extended header. HT field of the common header indicates TSB, and the extended header includes Source Position Vector (SO PV) field. The description for the field included is as below.

SO PV: A SO PV represents a position of source and may be a long position vector format.

In the case of the SHB packet, since a transmission count is limited by the number of hops, a destination address may be omitted. Since transmission is not performed in multi-hop, an SN field for redundancy examination may also be omitted.

FIG. 7 illustrates a geo-networking type and a header configuration thereof according to another embodiment of the present disclosure.

FIG. 7(a) shows a data forwarding method of Geographically-Scope Broadcast (GBC)/Geographically-Scoped Anycast (GAC) type, and FIG. 4(b) shows a GBC/GAC header configuration.

GeoBroadcast/GBC is a transmission scheme that broadcasts packets to all routers of a specific region, and GeoAnycast/GAC is a transmission scheme that broadcasts packets to only one router that receives a first packet in a specific region. In GBC, when data transferred from a source router is transferred to a specific destination region, a packet is broadcasted within a predetermined region. In GAC, when a packet is transferred to one router in a specific destination region, the packet is not transferred any more.

In FIG. 7(b), a GBC/GAC header includes a basic header, a common header and an extended header. HT field of the common header indicates GBC or GAC, and the extended header includes SN field, Source Position Vector (SO PV) field and destination region information. The destination region information includes an altitude (GeoAreaPosLatitude) field of a center of the destination region, a longitude (GeoAreaPosLongitude) field, distance fields (Distance a, b) for informing a range of the region and an angle field.

Sequence Number (SN): A Sequence Number field indicates a value used for examining a packet redundancy. A value of the Sequence Number field is increased by 1 when a source transmits a packet. A reception router may use a sequence number (or sequence number and TST value) and may determine whether a packet is redundantly received. The SN is a value used in multi-hop transmission.

SO PV: A SO PV represents a position of source and may be a long position vector format.

DE PV: A DE PV represents a position of destination and may be a short position vector format.

FIG. 8 illustrates a geo-networking type and a header configuration thereof according to another embodiment of the present disclosure.

FIG. 8 shows a header configuration of a beacon packet. The beacon packet header may include a basic header, a common header and an extended header, and the extended header includes SO PV information.

The beacon packet may be configured with the similar manner with the SHB packet header described above. The difference is that a message may be added behind of the SHB packet, and the SHB packet is used for forwarding data such as CAM, but data is not added to the beacon packet, and the beacon packet itself is used. The CAM or beacon that uses the SHB may be transmitted periodically. By transmitting and receiving the CAM or beacon, a router may obtain position information of neighboring routers and perform routing using the position information. As an embodiment, when the CAM is transmitted, the beacon may not be transmitted.

FIG. 9 illustrates a configuration of Location Service (LS) request and LS reply type packets according to an embodiment of the present disclosure.

FIG. 9(a) shows a LS request packet header, and FIG. 9(b) shows a LS reply packet header.

In the case that there is no destination information in its own location table, a source router may request geo-networking address information (GN_ADDR) for a destination to neighbors. Such an address information request may be performed such that the LS request packet transmits the LS request information (LS_request). In the case that the information requested by the source router is included in the location table of the router that receives the LS request packet, the router may transmit LS reply information (LS_reply). In addition, the router in the destination may transmit LS reply information in response to the LS request information.

The LS reply information includes position vector information of GN_ADDR. The source router may update the location table through the LS reply information. The source router may perform a GUC transmission by using the geo-networking address information which is received in response.

In FIG. 9(a), a configuration of the LS request packet header is similar to the GUC header. In the LS request packet header, a geo-networking address request field (RequestG-N_ADDR) is included, instead of the destination address field of the GUC header.

In FIG. 9(b), a configuration of the LS reply packet header is the same as the GUC packet header. However, the SO PV field includes position vector information of the router, and the DE PV field includes position vector information of the router that transmits the request.

FIG. 10 illustrates position vector information according to an embodiment of the present disclosure.

As described above, the geo-networking packet header includes a position vector (PV) field which is related to a position. A type of the position vector includes a long PV and a short PV. FIG. 10(a) shows long position vector information, and FIG. 10(b) shows short position vector information.

As shown in FIG. 10(a), the long position vector information includes subfields as follows.

GN_ADDR: The geo-networking address field may be configured with total 64 bits. The GeoAdhoc router that performs geo-networking transmission has a single unique geo-networking address value. The geo-networking address field may include subfields as follows.

a) M: A field for distinguishing between the geo-networking address or a manually configured value. As an embodiment, when the value is '1', M may be a manually configured value.

b) ST: ITS-S type field indicates a type of the ITS station. The ITS-S type may include a pedestrian, a cyclist, a moped, a motorcycle, a passenger car, a bus, a light truck, a heavy truck, a trailer, a special vehicle, a tram and an RSU.

c) MID: As V2X apparatus identification information, a MAC address may be used.

TimeSTamp (TST): The time stamp field indicates a time when the ITS station obtains altitude/longitude in the GeoAdhoc router. As a millisecond unit, Universal Time Coordinated (UTC) value may be used.

Latitude (LAT), Longitude (Long): The latitude field and the longitude field indicate an altitude value and a longitude value of a GeoAdhoc router.

Position Accuracy Indicator (PAI): This field indicates an accuracy of a GeoAdhoc router position.

Speed (S): This field indicates a speed of a GeoAdhoc router.

Heading (H): This field indicates a direction of a GeoAdhoc router.

As shown in FIG. 10(b), the shot position vector information includes the GN_ADDR field, the TST field, the LAT field and the Long field. The description for each field is as described above for the long position vector.

Various packet forwarding methods may be used for a geo-networking transmission. For example, greedy forwarding algorithm, contention-based forwarding algorithm, non-area contention-based forwarding algorithm, area contention-based forwarding algorithm and area advanced forwarding algorithm may be used. The forwarding algorithm is used for transferring and distributing data to an objected area efficiently. In the case of the greedy forwarding algorithm, the source router determines a forwarding router, and in the case of the contention-based forwarding algorithm, the reception router determines whether to forward a packet by using contention. That is, when a timer expires, the reception router determines itself as a forwarder and transmits a packet. However, when the reception router receives the same packet until a timer expires, the reception router determines itself not to be a forwarder and discard the packet. Hereinafter, the non-area contention-based forwarding algorithm is described.

In the geo-networking, each V2X apparatus may perform a router function and use an ad hoc method for determining routing of packets. Each V2X apparatus may transmit the vehicle's location information, speed information, and heading information to the surroundings, and using this information, each V2X apparatus may determine the routing of packets. The periodically received information is stored in a location table (LocT) of the network & transport layer, and the stored information may be timed out after a certain time. The LocT may be stored in a location table entry (LocTE).

In order for the geo-networking protocol to work, each ad hoc router must have information about another ad hoc router. Information on neighboring routers may be received through the SHB or beacon packet. The router may update the LocT when new information is received. The transmission period of the SHB or beacon packet may change depending on the channel state. The location/location table may be referred to as LocT.

The information on the neighboring routers may be stored in the LocT, and the stored information may include at least one of the following information. The information stored in the LocT may be deleted from the list when the lifetime set in the soft-state state expires.

GN_ADDR: geo-network address of the ITS station

Type of ITS-S: a type of the ITS station, for example, indicating whether it is a vehicle or an RSU.

Version: geo-networking version used for the ITS station

Position vector PV: position vector information may include at least one of geographical position information, speed information, heading information, time stamp information indicating the time of measurement of location information, and position accuracy indicator (PAI) information indicating the accuracy of the provided position.

Flag LS_PENDING (LS_PENDING flag): a flag indicating when a location service request is in progress because a current LocT does not have an address for a destination FLAG IS_NEIGHBOUR (IS_NEIGHBOUR flag): a flag indicating whether there is a geo-ad hoc router that can communicate within the communication range DPL: duplicate packet list for source GN_ADDR Type Stamp: time stamp of a final packet indicating an end of duplication.

PDR(Packet Data Rate): packet transmission rate that the geo-ad hoc router should maintain FIG. 11 illustrates a packet forwarding method of a greedy forwarding algorithm according to an embodiment of the present disclosure.

The greedy forwarding algorithm determines that a sender forwards packets to whom among the neighboring routers the sender knows. The location table (LocT) of the sender may be updated to the latest value through periodically distributed SHB or beacon packets. The sender may select a router closest to the destination from the LocT so that the packets can be forwarded to the destination with the least hop.

In FIG. 11, there exist routers 1 to 5 within a communication range of a source router. The source router transmits the packet by setting a MAC address of router 2 closest to the destination as a link layer destination address.

The greedy forwarding algorithm does not use buffering, and can quickly forward a packet to the destination unless the connection between routers is broken. However, if the connection between routers is broken, i.e., if the router to transmit the next hop is out of the communication range or disappears, the reliability may be lowered because the packet cannot be forwarded.

FIG. 12 illustrates a pseudo code showing a greedy forwarding algorithm according to an embodiment of the present disclosure.

In the pseudo-code of the present disclosure, definitions of elements are as follows.

P: GN packet to be forwarded i: i-th LctTE

NH: locTE identified as next hop. NH_LL_ADDR is its link layer address

NH_LL_ADDR: link layer address of the next hop

EPV: ego position vector

PV_P: destination position vector included in geo-networking packet

PV_: position vector of the i-th LocTE

MFR: progress according to most forward with radius (MFR) policy. It can be set as a distance between a router itself and a destination.

B: forwarding packet buffer (It can be US forwarding buffer or BC forwarding buffer depending on type of packet)

TC: the traffic class of GN-Data.request (source operations) or the field in the received common header (forwarder operations). A back-off time may be determined at an access layer according to the traffic class.

In line 13, the router may set the distance between itself and the destination to MFR.

As in lines 14 to 21, the router obtains the distance between i-th router and the neighboring routers stored in LocTE, and searches for routers having a minimum distance to the destinations of the routers stored in LocTE.

As in lines 22 to 23, the router sets the MAC address of the router having the minimum distance to the destination as NH_LL_ADDR.

As in line 24, if an MFR value is greater than the distance between itself and the destination, the router determines that there is no neighboring router to forward.

As in lines 25 to 26, if store carry & forward (SCF) is enabled, the value is stored in the "forwarding packet buffer" for some time, and if an ad hoc router is detected, forwarding is executed.

As in lines 28 to 29, if the SCF is disabled, the router sets the destination address of the MAC to BCAST and broadcasts the packet.

FIG. 13 illustrates a greedy forwarding algorithm according to an embodiment of the present disclosure.

In FIG. 13, an ego router sets MFR using an ego position vector (EPV) and a position vector (PV_P) of the destination.

As shown in FIG. 13, the ego router obtains the distance between the position vector (PV_1–PV_5) for the routers stored in LocTE and the destination, and sets the obtained distance to the MFR if the distance is less than the MFR. The router performs all of these processes for the routers stored in LocTE, and eventually, the distance of the router with the minimum distance becomes the final MFR (final_MFR).

The source router sets the MAC address of the PV_1 router corresponding to the final MFR as the destination address of the MAC header of the transmission packet. Therefore, the packet is transmitted to the PV_1 router.

Hereinafter, a greedy forwarding algorithm for improving reliability in a dynamic environment will be described. For a more reliable greedy forwarding algorithm, the present disclosure further proposes a method of selecting a transmitter/forwarder. The following four methods are proposed for selecting the forwarder, and the following four methods may be used separately or in combination with other methods.

(1) A method of using updated numbers of location information (2) A method of estimating a moving location (3) A method of using reliability function/relatively stable function (4) A method of transmitting reliable multi-hops through dual paths FIG. 14 is a pseudo code showing a greedy forwarding algorithm using an updated number of location information according to an embodiment of the present disclosure.

As described above, the location information is received at a predetermined period through the SHB/beacon, stored in the LocTE, and updated. However, the location information received from the ITS-station at the communication coverage boundary may not be updated at the same period. For example, location information of a router close to the source router may be updated 10 times per second, and location information of a router near the coverage may be updated 3 to 5 times per second. The location information stored in LocTE disappears after a certain time, which is independent of the update period.

The router having the highest updated number for some time may be the most reliable forwarder. Thus, the router may determine at least one of the router with the most updates and the router with the next most updates for some time as a forwarder. Alternatively, the router may determine a router closest to the destination among routers updated over a certain number for some time as a forwarder.

In FIG. 14, additional elements for implementing the present disclosure are as follows.

TH: a threshold value indicating the updated number of the positioning vector for some period.

NUM: the updated number of the positioning vector for some period

As in line 18, the router counts the updated number for some time, and determines only routers whose updated number is greater than the threshold value as forwarder candidates of the greedy forwarding algorithm. For example, only routers updated more than 10 times in one second may be determined as forwarder candidates, and the router closest to the destination among the forwarder candidates may be selected as the forwarder.

The numeric information (NUM) may indicate the number or frequency of updating the location value for some time. The threshold value (TH) information indicates a minimum value at which the updated number can be considered to be reliable. The threshold value (TH) information may be set by various criteria and methods.

FIG. 15 is a pseudo code showing a greedy forwarding algorithm using an updated number of location information according to another embodiment of the present disclosure.

FIG. 15 shows a method of determining a reliable forwarder by applying weights to each of the number of times the location information is updated and the distance between the i-th router of LocT and the destination.

In FIG. 15, additional elements for implementing the present disclosure are as follows.

MFRR: indicates the progress according to the MFRR policy
α: coefficient of distance
β: coefficient of updated number
NUM: the updated number of the positioning vector for some period As in line 15, setting the MFRR, the MFRR can be obtained by multiplying the distance between the router and the destination by a.

As in line 18, the MFRR may be obtained as in Equation 1 below.

$$MFRR = \alpha \times DIST(PV\_P, PV\_I) - \beta \times NUM (\alpha > 0, \beta > 0)$$

【Equation 1】

As the MFRR has a smaller value, the MFRR may be determined to be a more forwardable value. β and β are values for weighting each variable, and may be determined as values that improve geo-networking performance with arbitrary experimental values.

As in lines 15-18, the router finds the smallest MFRR value by applying weights a and β to the distance to the destination and the updated number, respectively, for all routers within the transmission range. And the router with the smallest MFRR value can be determined as the forwarder. According to this embodiment, the transmission reliability can be improved by finding the local optimum forwarder but additionally reflecting the updated number without considering only the distance to the destination.

FIG. 16 illustrates an update time of LocTE for each router for estimating a moving location of a router according to an embodiment of the present disclosure.

The router may estimate the location of another router using at least one of location information included in LocTE, timestamp information from which the location information is measured, moving speed information, or moving direction information. The router may then select a forwarder based on the estimated location.

FIG. 16 illustrates a time and period updated for each router. In FIG. 16, the location and other information at the indicated time are stored in the LocTE. That is, the information of LocTE may be updated in router 1 at time t_1, router 2 at time t_2, router 3 at time t_3, router 4 at time t_4, and router 5 at time t_5. The source router may estimate the current location of the external router using the information of the past time point, and select the forwarder based on the estimated location.

FIG. 17 illustrates a method for estimating a location of a router according to an embodiment of the present disclosure.

As shown in FIG. 17(a), the source router S estimates a moving distance of the i-th router. If a speed vector of the i-th router is represented by SV_I, the estimated moving distance is SV_I*(T−t_i). In the speed vector SV_I, the speed of the i-th router may be the magnitude of the vector, and the head direction may be the direction value of the vector. T indicates the current time to estimate and t_i indicates the timestamp value of the position vector.

In FIG. 17(b), the source router may estimate an end point of an obtained vector as a moving location of the router. The source router may determine that only a router whose estimated moving location is within a maximum communication range R is a valid router. The maximum communication range, as an embodiment, this value may be used as a value defined in a specification describing an ITS access technology (for example, ETSI TS 102 636-4-2, the specification of GeoNetworking media dependent functionality), or a value defined in 'itsGnDefaultMaxCommunicationRange' of the Management Information Base (MIB) of the GN protocol.

In FIG. 17(c), the source router may measure the distance between the router and the destination for all estimated valid routers.

In FIG. 17(d), the source router may select a router having a shortest distance between destinations among the valid routers as a forwarder.

FIG. 18 is a pseudo code showing a greedy forwarding algorithm using location estimation of a router according to an embodiment of the present disclosure.

FIG. 18 illustrates a greedy forwarding algorithm for estimating a current location of neighboring routers and determining a forwarder using the estimated current location.

In FIG. 18, additional elements for implementing the present disclosure are as follows.

MFRR: indicates progress according to the MFRR policy
R: theoretical maximum communication range
T: current time to calculate MFR
t_i: updated time of the i-th LocTE
ESV: ego speed vector
SV_I: speed vector of the i-th LocTE
EST_PV_I: estimated position vector of the i-th LocTE As in line 22, PV_I (t_i) is a position vector of a packet received from the i-th router, and t_i is a time stamp value included in the packet. SV_I represents the speed vector of the i-th router. The magnitude of this vector may be the speed S and the direction may be the vehicle head direction H. Assuming that the i-th router moves at constant speed, a distance vector moved up to the current time T may be estimated as (T−t_i)*SV_I (T−i). Therefore, the estimated position of the current i-th router can be obtained by adding the estimated moving distance (T−t_i)*SV_I (T−i) to the past position vector PV_I (ti).

As in line 23, routers whose estimated location is within the maximum communication range of the ego router are determined as candidate routers. That is, subsequent processing is performed on routers in which the distance DIST (PV_P, EST_PV_I) between the ego router and the estimated position is within the maximum communication range R.

As in lines 24 to 27, among the routers whose estimated position is within the maximum communication range R of the ego router, the router having the smallest distance to the destination is determined as the forwarder. To minimize errors in position estimation, neighboring routers can use the PAI, which indicates the accuracy of the speed and head direction, set to "TRUE".

The moving position measuring method is performed under some assumptions. The speed recorded in LocTE is an instantaneous speed, but the instantaneous speed is assumed to be an average speed. In addition, the maximum communication range may differ from the theoretical value. The maximum communication range may not be a theoretical circle, may be changed by external conditions such as weather, or may be elliptical due to the deflection of the antenna. Therefore, the following describes how to use the reliability function.

The relatively stable function (RSF) is a function of how reliable the neighboring router selected as a forwarder is as a forwarder. The RSF is obtained by considering the following three things.

1) change in a distance from sender for some time
2) distance to destination
3) the number of location information to be updated A router having a small change in the distance from the sender for some time and having a large updated number of the location information can be estimated as a stable router. The ego router can determine the router having the smallest distance to the destination among these routers as the forwarder. The reliability function may be expressed as Equation 2 below.

$$ReliabilityFunction(i) = \frac{\gamma * number\_of\_position\_update(i)}{\alpha * variance\_of\_location(i) + \beta * distance\_from\_destination(i)} \quad \text{[Equation 2]}$$

'number_of_position_update' indicates the updated number of the position vector for the i-th router for some time, and 'variance_of_location' indicates a degree of change in a relative distance between the sender router and the i-th router. 'distance_from_destination' indicates the distance between the i-th router and the destination. Parameters $\alpha$, $\beta$, and $\gamma$ in front of each variable are arbitrary values for giving a weight to each variable.

As an embodiment, the function may be configured more simply by limiting the number of variables. To this end, for a particular router, if the updated number of the location information exceeds a predetermined threshold value, the router may be determined as a reliable router. The operation of RSF may be performed as follows.

1) The ego router searches for a router in which an updated number of the location information exceeds a threshold value for some time.
2) The ego router measures an average of the changed distance between the router and the sender router for the routers found in 1).
3) The ego router measures a distance to the destination based on a recently updated location.
4) Calculate the reliability for each router by entering values in the RSF.

The RSF for calculating reliability is expressed by Equation 3 below.

$$RSF(i) = \alpha * variance\_of\_location(i) + \beta * distance\_from\_destination(i) \quad \text{[Equation 3]}$$

In Equation 3, $\alpha$ and $\beta$ are values for weighting variables, respectively, and may be set in consideration of the number of neighboring routers and the moving speed.

FIG. 19 illustrates locations and updated numbers observed for neighboring routers for T time based on a sender router according to an embodiment of the present disclosure.

FIG. 19 shows a location where neighboring routers are observed for T time based on the sender router S. In FIG. 19 (a), white circles indicate changed locations of respective routers updated for some time, and black circles indicate locations of the most recently updated routers.

In FIG. 19, router 4 (n4) has been updated three times in location, and router 3 (n3) has been updated six times in location. Thus, the ego router can exclude the router 4 from the reliability function calculation. If the updated number is less than a threshold, such a router may be determined to be a router having a low reliability because it exists in a communication boundary range. That is, such a router is excluded from the reliability function calculation target, and the ego router can calculate the RSF using a stable location change and a close distance to the destination. As the RSF value has a lower value, it can be determined as a more stable router.

FIG. 20 illustrates a position vector and an updated number for each router updated in a location table according to an embodiment of the present disclosure.

The updated number of the respective routers during the observation time T is 9 (NUM_1=9 for Router1) for router 1, 9 (NUM_2=9 for Router2) for router 2, 6 (NUM_3=6 for Router3) for router 3, 1 (NUM_4=1 for Router4) for router 4 and 3 (NUM_5=3 for Router5) for router 5.

The position vector for each router updated in LocT is represented by PV-ij during a predetermined time T for the i-th router. In FIG. 20, router 3 has been updated six times during the observation time (T), and each updated position vector is equal to PV_31, PV_32, PV_33, PV_34, PV_35 and PV_36.

FIG. 21 illustrates a pseudo code showing a greedy forwarding algorithm using a reliability function according to an embodiment of the present disclosure.

In FIG. 21, additional elements for implementing the present disclosure are as follows.

j: j-th updated position vector for some period
NUM: number of updated position vector for some period
NUM_TH: threshold indicating the minimum updated number of the position vector for some period
DIFFSUM: sum of differences among updated position vectors for some period
VARIANCE: variance
EPV_ij: ego position vector at the same time of ij-th LocTE
PV_I: ego position vector at the same time of i-th LocTE
PV_F: final position vector of potential selected forwarder
PV_ij: position vector of ij-th LocTE
RSF: progress according to the RSF policy, RFG can be a reliability function of Equation 3.
$\alpha$: coefficient of distance
$\beta$: coefficient of position vector variance As in lines 22 to 32, the ego router calculates the sum of relative position differences (i.DIFFSUM) with the sender for all i routers included in LocT.

As in lines 25 to 26, the ego router calculates a relative distance variance (i.VARIANCE) only for a router whose updated number of the position vector (i.NUM) exceeds a certain value (NUM_TH) for some time. As in lines 29 to 30, if the updated number (i.NUM) of the position vector does not exceed the certain value (NUM_TH) for some time, the relative distance variance is assumed as a MAX value. This is to determine that it is unstable when the updated number is small.

The relative distance variance value is an absolute value obtained by subtracting the difference between the position vector PV_i (j+1) and the position vector EPV_i (+1) of the sender router at (j+1) time from the difference between the position vector PV_ij and the position vector EPV_ij of the sender router at j time in the i-th router. As in line 26, the value summed by calculating this absolute value for some time (T) is the total variance amount. As in line 28, dividing the total variance amount by the updated number, the average relative distance variance amount can be obtained for each i-th router.

As in lines 34 to 43, the i-th router having the smallest RSF value is identified using the average relative distance variance amount obtained for each router, and the router may be determined as a forwarder candidate. As in line 44, the potential (NextHeader) is determined by using the information on the determined router, and the recently updated position vector of this router is stored as PV_F. In line 44, if the distance between the stored PV_F value and the destination is less than the distance between the sender (EPV) and the destination, as the router is located in the destination direction compared to the sender, as in line 45, a forwarder candidate that satisfies the condition of line 44 is determined as a final forwarder.

FIG. 22 illustrates a pseudo code showing a greedy forwarding algorithm using a reliability function according to another embodiment of the present disclosure.

In FIG. 22, additional elements for implementing the present disclosure are as follows, compared to the pseudo code of FIG. 21.

γ: coefficient of position difference from EVP

The embodiment of FIG. 22 is a method of adding a weight to recent location information when measuring a relative distance variance to a sender router. Among the location information, it is highly likely that the recent location information is closest to the current location. Therefore, a weight is added to recent updated location information close to the current measurement time, and the weight may be a value that changes according to time.

As in line 27, a coefficient $γ(j)$ may be added to the relative distance difference. This $γ(j)$ is a coefficient that weights a distance difference relative to the recently obtained EPV compared to a distance difference relative to previously obtained EPV. The $γ(j)$ may be a value that changes according to the j value.

FIG. 23 illustrates a greedy forwarding transmission method using a reliability function according to another embodiment of the present disclosure.

As an embodiment, the ego router may calculate a difference between the estimated position and the actual position for some time, and determine that the smaller the variance amount is, the more stable the router is. The ego router may determine the router closest to the destination among these routers as the next forwarder.

In FIG. 23, the ego router may estimate the location of the next update moment as PV_32' based on the current updated location information PV_32 of router 3. And in the next update, the ego router may calculate the location difference between PV_32' and PV_33. By performing such an operation for T time, the router having a small average variance amount of a difference between the estimated location and the actual update location may be determined as a stable router.

In FIG. 23, as in the case of router 4, since the router, which is updated only once for some time, may not compare the estimated value with the current value, it may be excluded from the calculation. The ego router may determine a router that is close to the destination among stable routers as the next forwarder by applying the RSF method described above. As an embodiment, the ego router can determine the next forwarder by applying an appropriate weight to the stability and the distance to the destination as in the RSF method of FIG. 21 described above, or by applying weights to recently calculated stability information as in the RSF method of FIG. 22 described above.

FIG. 24 illustrates a pseudo code showing a greedy forwarding algorithm using a reliability function according to the embodiment of FIG. 23.

In FIG. 24, additional operations for implementing the present disclosure will be described as compared to the pseudo code of FIG. 21.

As in line 27, the ego router calculates an estimated position vector based on past updated information whenever the location information is updated for each router. A value obtained by multiplying a past speed vector SV_ij by a time difference ti (j+1)−t_ij becomes an estimated moving distance vector. As in lines 28 to 29, the ego router obtains the difference (DIFF) between the estimated moving distance vector and the actual updated value, and adds this value for some time to obtain DIFFSUM. As the difference between the estimated position vector value and the actual updated value is smaller, that is, a router having a small DIFFSUM value may be determined as a reliable router in the sender. As in line 29, a weight $γ(j)$ may be added to the difference value to increase the reliability of the recent value.

The RSF value is determined by combination of the distance to the destination and the DIFFSUM value, and weights $α$ and $β$ may be added to each value. As the RSF value is smaller, the router is better to be selected as a forwarder, and the RSF value may be calculated for all routers as shown in lines 34 to 43. As in line 39, the position vector of the router having the smallest RSF value becomes PV_F. As in lines 44 to 45, among routers having a small RSF value, the router whose distance between the router and the destination is smaller than the distance between the sender and the destination may be determined as the next forwarder. Since a router having a larger distance is a router located farther than its destination based on the sender, it is not selected as a forwarder.

By using the RSF described above, the reliability of each router may be expressed as a value, and the obtained reliability may be reflected in the forwarder decision. In addition, by using the RSF, the router may perform communication based on different reliability for each packet or for each situation. As an embodiment, the router may increase transmission reliability by transmitting the same packet multiple times. The router may further increase the reliability by using the RSF even when transmitting the packet multiple times.

FIG. 25 illustrates a packet transmission method using RSF according to an embodiment of the present disclosure.

In order to increase transmission reliability, one packet in the router may find and transmit the most forwardable router, and the other packet may find and transmit a second forwardable router. That is, as shown in FIG. 25, one packet is forwarded by routers closest to the destination in the transmission range based on the greedy forward algorithm. The other packet may be forwarded by the routers second close to the destination in the transmission range but with higher reliability based on the reliable greedy forward algorithm.

In FIG. 25, two paths are set based on the distance between the router and the destination. The two paths may be set based on the distance to the destination. When transmitting the same information repeatedly, odd-numbered packets are multi-hop transmitted by a forwardable router closest to the destination, and even-numbered packets may be multi-hop transmitted by a forwardable router second close to the destination. To determine the two paths, it must be forwarded to the next router whether the packet is to be transmitted based on the greedy forwarding algorithm or based on the reliable greedy forward algorithm.

FIGS. 26 and 27 illustrate a geo-networking packet header according to an embodiment of the present disclosure.

FIG. 26 shows a geo-unicast header, and FIG. 27 shows a header of a geographically-scope broadcast (GBC)/geographically-scoped anycast (GAC) type. As in the embodiment of FIG. 26 and FIG. 27, an RFL field may be added to the geo-networking header. In an embodiment, the RFL field may be included in the same raw as an SN field.

The reliable forwarder level (RFL) field may indicate how reliable the packet is to be forwarded.

As an embodiment, if the RFL value is 1, the router receiving the packet may forward the packet to the most forwardable router. In other words, the router may forward the packet to the router closest to the destination in the transmission range. If the RFL value is 2, the router receiving the packet may forward the packet to the router second close to the destination.

A packet may be forwarded through a plurality of paths according to the RFL value. Based on the RFL value, since the packet is forwarded through the fastest path and the more reliable path, the packet transmission reliability can be greatly improved.

FIG. 28 illustrates a configuration of a V2X communication apparatus according to an embodiment of the present disclosure.

In FIG. 28, the V2X communication apparatus 28000 may include a communication unit 28010, a processor 28020, and a memory 28030.

The communication unit 28010 may be connected to the processor 28020 to transmit/receive wireless signals. The communication unit 28010 may transmit a signal by upconverting data received from the processor 28020 into a transmission/reception band, or downconvert the received signal. The communication unit 28010 may implement at least one of a physical layer and an access layer.

The communication unit 28010 may include a plurality of sub-RF units to communicate according to a plurality of communication protocols. As an embodiment, the communication unit 28010 may perform data communication based on dedicated short range communication (DSRC), IEEE 802.11 and/or 802.11p standards, ITS-G5 wireless communication technology based on the physical transmission technology of the IEEE 802.11 and/or 802.11p standard, 2G/3G/4G(LTE)/5G wireless cellular communication technology including satellite/broadband wireless mobile communication, broadband terrestrial digital broadcasting technology such as DVB-T/T2/ATSC, GPS technology, and IEEE 1609 WAVE technology or the like. The communication unit 28010 may include a plurality of transceivers that implement each communication technology.

The processor 28020 may be connected to the RF unit 2830 to implement operations of layers according to the ITS system or the WAVE system. The processor 28020 may be configured to perform operations according to various embodiments of the present disclosure according to the above-described drawings and descriptions. In addition, at least one of a module, data, a program, or software for implementing an operation of the V2X communication apparatus 28000 according to various embodiments of the present disclosure described above may be stored in the memory 2830 and executed by the processor 28020.

The memory 28030 is connected to the processor 28020 and stores various information for driving the processor 28020. The memory 2830 may be included in the processor 28020 or may be installed outside the processor 2820 to be connected to the processor 2820 by a known means.

The processor 28020 of the V2X communication apparatus 28000 may perform geo-networking packet transmission by performing the forwarding algorithm described in the present disclosure. The geo-networking packet transmission method of the V2X communication apparatus 28000 will be described below.

FIG. 29 is a flowchart illustrating a geo-networking transmission method according to an embodiment of the present disclosure.

The V2X communication apparatus configures location information (S29010).

The location information (LocT) is a local data structure maintained by the V2X communication apparatus, and includes information on V2X communication apparatuses executing a geo-networking protocol. As described above, the location information includes at least one of geo-network address information, link layer address information, type information, and position vector information on at least one of the neighboring V2X communication apparatuses from which the V2X communication apparatus receives the geo-networking packet. The above description applies to LocT.

The V2X communication apparatus selects a forwarder candidate among neighboring V2X communication apparatuses included in the location table (S29020).

As described above, the V2X communication apparatus may determine the forwarder candidate according to various embodiments.

First, as in the embodiment described above with reference to FIGS. 14 to 15, the selecting the forwarder candidate may be performed based on an updated number of the position vector of the neighboring V2X communication apparatus.

In addition, as in the embodiment described above with reference to the embodiments of FIGS. 16 to 18, the selecting the forwarder candidate may further include estimating a current location of the neighboring V2X communication apparatus and selecting the forwarder candidate based on the estimated current location, an effective communication range, and a distance to a destination of the neighboring V2X communication apparatus.

In addition, as in the embodiment described above with reference to FIGS. 19 to 24 and the reliability function, the selecting the forwarder candidate may further include obtaining a reliability value of the neighboring V2X communication apparatus and selecting the forwarder candidate based on the reliability value. The reliability value may be obtained based on an updated number of the position vector for the neighboring V2X communication apparatus, and an amount of change in a distance between the V2X communication apparatus and the neighboring V2X communication apparatus.

The V2X communication apparatus determines a forwarder based on a distance between the forwarder candidate and the destination, and sets an address of the determined forwarder as a link layer address of a next hop (S29030).

As described above, when a distance between the forwarder candidate and the destination is smaller than a distance between the V2X communication apparatus and the destination, the V2X communication apparatus may set the link layer address of the forwarder candidate as the link layer address of the next hop. That is, when the distance between the forwarder candidate and the destination is smaller than the distance between the V2X communication apparatus and the destination, the forwarder candidate may be determined as a forwarder, and the address of the determined forwarder may be set as the link layer address of the next hop of the packet.

The V2X communication apparatus transmits a geo-networking packet based on the set link layer address (29040).

The V2X communication apparatus may broadcast a geo-networking packet in which the link layer address of the next hop is set. The V2X communication apparatuses whose link layer addresses do not match among neighboring V2X communication apparatuses that receive the geo-networking packet may discard this packet. The V2X communication apparatuses, i.e. a forwarder, whose link layer addresses match among neighboring V2X communication apparatuses that receive the geo-networking packet may forward the received packet. The forwarder may determine the next forwarder based on the greedy forwarding algorithm described above and forward the packet to the destination. The link layer address may be set as a destination address of the geo-networking packet and transmitted.

As in the embodiment described above with reference to FIGS. 25 to 27, the geo-networking packet may include forwarder level information indicating whether the geo-networking packet is transmitted to the most forwardable router or to a second forwardable router. Therefore, the geo-networking packet may be forwarded through a plurality of paths based on the forwarder level information.

According to the present disclosure, it is possible to provide reliable geo-networking transmission for a dynamic communication environment. The greedy forwarding algorithm, which determines and forwards the forwarder without using a buffer and a timer, has a high transmission speed, but may make transmission impossible if the forwarder temporarily disappears from the communication range. The present disclosure does not merely determine the router closest to the destination among the routers within the communication range, but can significantly improve the transmission reliability based on the updated number of the location information, the estimated current location, and the reliability. In other words, according to the present disclosure, it is possible to significantly lower the risk of forwarding failure while maintaining the advantages of rapid forwarding of greedy forwarding.

In the embodiments described above, the components and the features of the present disclosure are combined in a predetermined form. Each component or feature should be considered as an option unless otherwise expressly stated. Each component or feature may be embodied in a form that is not combined with other components or features. It is also possible to combine some of the components and/or features to form an embodiment of the present disclosure. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments according to the present disclosure may be implemented by various means, for example, hardware, firmware, software, or combinations thereof. In the case of a hardware implementation, an embodiment of the present disclosure may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, an embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the above-mentioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

MODE FOR INVENTION

It is understood by those skilled in the art that various changes and modifications can be made in the present disclosure without departing from the spirit or scope of the present disclosure. Accordingly, it is intended that the present disclosure include the modifications and variations of the present disclosure provided within the scope of the appended claims and their equivalents.

In the present disclosure, both apparatus and method inventions are mentioned, and descriptions of both apparatus and method inventions may be complementarily applied to each other.

Various embodiments have been described in the best mode for carrying out the present disclosure.

INDUSTRIAL APPLICABILITY

The present disclosure is used in the field of vehicle communication.

It is apparent to those skilled in the art that various changes and modifications can be made in the present disclosure without departing from the spirit or scope of the present disclosure. Accordingly, it is intended that the present disclosure include the modifications and variations of the present disclosure provided within the scope of the appended claims and their equivalents.

The invention claimed is:

1. A geo-networking transmission method of a V2X communication apparatus, comprising:
    configuring location information, wherein the location information includes information on a V2X communication apparatus executing a geo-networking protocol;
    selecting a forwarder candidate among neighboring V2X communication apparatuses included in a location table;
    determining a forwarder based on a distance between the forwarder candidate and a destination, and setting an address of the determined forwarder as a link layer address of a next hop; and
    transmitting a geo-networking packet based on the link layer address,
    wherein the geo-networking packet includes forwarder level information indicating whether the geo-networking packet is transmitted to a most forwardable router or to a second forwardable router.

2. The geo-networking transmission method of claim 1, wherein the location information includes at least one of geo-network address information, link layer address information, type information, and position vector information on at least one of the neighboring V2X communication apparatuses from which the V2X communication apparatus receives the geo-networking packet.

3. The geo-networking transmission method of claim 2, wherein selecting the forwarder candidate is performed based on an updated number of the position vector of the neighboring V2X communication apparatus.

4. The geo-networking transmission method of claim 2, wherein selecting the forwarder candidate further includes:
   estimating a current location of the neighboring V2X communication apparatus; and
   selecting the forwarder candidate based on the estimated current location, an effective communication range, and a distance to a destination of the neighboring V2X communication apparatus.

5. The geo-networking transmission method of claim 2, wherein selecting the forwarder candidate further includes:
   obtaining a reliability value for the neighboring V2X communication apparatus; and
   selecting the forwarder candidate based on the reliability value.

6. The geo-networking transmission method of claim 5, wherein the reliability value is obtained based on an updated number for the position vector of the neighboring V2X communication apparatus, and an amount of change in distance between the V2X communication apparatus and the neighboring V2X communication apparatus.

7. A V2X communication apparatus, comprising:
   a memory for storing data;
   a transceiver for transmitting and receiving a radio signal including a geo-networking packet; and
   a processor configured to control the memory and the transceiver, wherein the processor is further configured to:
      configure location information, wherein the location information includes information on a V2X communication apparatus executing a geo-networking protocol,
      select a forwarder candidate among neighboring V2X communication apparatuses included in a location table,
      determine a forwarder based on a distance between the forwarder candidate and a destination, and setting an address of the determined forwarder as a link layer address of a next hop, and
      transmit a geo-networking packet based on the link layer address,
   wherein the geo-networking packet includes forwarder level information indicating whether the geo-networking packet is transmitted to a most forwardable router or to a second forwardable router.

8. The V2X communication apparatus of claim 7, wherein the location information includes at least one of geo-network address information, link layer address information, type information, and position vector information on at least one of the neighboring V2X communication apparatuses from which the V2X communication apparatus receives the geo-networking packet.

9. The V2X communication apparatus of claim 8, wherein selecting the forwarder candidate is performed based on an updated number for the position vector of the neighboring V2X communication apparatus.

10. The V2X communication apparatus of claim 8, wherein selecting the forwarder candidate is performed by estimating a current location of the neighboring V2X communication apparatus, and selecting the forwarder candidate based on the estimated current location, an effective communication range, and a distance to a destination of the neighboring V2X communication apparatus.

11. The V2X communication apparatus of claim 8, wherein selecting the forwarder candidate is performed by obtaining a reliability value for the neighboring V2X communication apparatus, and selecting the forwarder candidate based on the reliability value.

12. The V2X communication apparatus of claim 11, wherein the reliability value is obtained based on an updated number for the position vector of the neighboring V2X communication apparatus, and an amount of change in distance between the V2X communication apparatus and the neighboring V2X communication apparatus.

* * * * *